US011909517B2

(12) United States Patent
Smith et al.

(10) Patent No.: US 11,909,517 B2
(45) Date of Patent: Feb. 20, 2024

(54) SYSTEMS AND METHODS FOR SECURE, LOW BANDWIDTH REPLICATED VIRTUAL WORLDS FOR SHARED SPACE COMPUTING

(71) Applicant: CEO Vision, Inc, Cary, NC (US)

(72) Inventors: David A. Smith, Cary, NC (US); Brian Upton, Los Angeles, CA (US); Bert Freudenberg, Los Angeles, CA (US); Aran Lunzer, West Hollywood, CA (US); Yoshiki Ohshima, Valley Village, CA (US); Anselm Eickhoff, Berlin (DE)

(73) Assignee: CEO VISION, INC, Cary, NC (US)

( * ) Notice: Subject to any disclaimer, the term of this patent is extended or adjusted under 35 U.S.C. 154(b) by 0 days.

(21) Appl. No.: 16/883,804

(22) Filed: May 26, 2020

(65) Prior Publication Data
US 2020/0382232 A1    Dec. 3, 2020

Related U.S. Application Data

(60) Provisional application No. 62/854,232, filed on May 29, 2019.

(51) Int. Cl.
*H04J 3/06*    (2006.01)
(52) U.S. Cl.
CPC .......... *H04J 3/0667* (2013.01); *H04J 3/0664* (2013.01); *H04J 3/0673* (2013.01); *H04J 3/0697* (2013.01)
(58) Field of Classification Search
CPC ...... H04J 3/0667; H04J 3/0673; H04J 3/0664; H04J 3/0697

(Continued)

(56) References Cited

U.S. PATENT DOCUMENTS

| 7,680,876 B1 * | 3/2010 | Cioli | G06F 11/2097 |
| | | | 709/201 |
| 9,955,393 B2 * | 4/2018 | Watfa | H04W 36/0055 |

(Continued)

FOREIGN PATENT DOCUMENTS

WO    WO-2007136021 A1 *    11/2007    ......... G06F 9/45558

OTHER PUBLICATIONS

ISA/US, "Notification of Transmittal of the ISR and the Written Opinion of the International Searching Authority, or the Declaration," in PCT Application No. PCT/US2020/034986 dated Oct. 27, 2020, 13 pages.

*Primary Examiner* — Kibrom T Hailu
*Assistant Examiner* — Nizam U Ahmed
(74) *Attorney, Agent, or Firm* — Kang S. Lim

(57) ABSTRACT

Systems and methods for a shared virtual environment are provided. The systems and methods include a unique architecture where domains known as "islands" are replicated across various local machines. These islands include objects that publish events. These events include messages that are provided from the island's controller, to a reflector for the addition of a timestamp. The timestamp ensures computational synchronization between all mirrored islands. The timestamped messages are provided from the reflector back to the controllers of the various islands. The controllers incorporate these messages into the existing message queue based upon the message timing. The local machines then execute the messages in time order, until the external message indicates. These timestamp "heartbeats" thus dictate the execution activity across all islands and ensure synchronization of all islands.

11 Claims, 27 Drawing Sheets

(58) Field of Classification Search
USPC .......................................................... 370/503
See application file for complete search history.

(56) References Cited

U.S. PATENT DOCUMENTS

| | | | |
|---|---|---|---|
| 2012/0271944 | A1 | 10/2012 | Turner et al. |
| 2013/0215754 | A1* | 8/2013 | Tripathi ................. H04L 69/22 |
| | | | 370/236 |
| 2015/0089555 | A1* | 3/2015 | Abkairov ............... H04N 7/173 |
| | | | 725/109 |
| 2015/0195178 | A1* | 7/2015 | Bhattacharya ........ H04L 41/342 |
| | | | 718/1 |
| 2016/0041728 | A1 | 2/2016 | Dempski et al. |
| 2016/0352866 | A1* | 12/2016 | Gupta .................... H04L 43/08 |
| 2018/0095855 | A1* | 4/2018 | Sanakkayala ....... G06F 11/1438 |
| 2018/0139131 | A1* | 5/2018 | Ignatchenko ......... H04L 45/121 |
| 2018/0191867 | A1 | 7/2018 | Siebel et al. |
| 2019/0065277 | A1* | 2/2019 | Raikov ................... H04L 67/10 |
| 2019/0124671 | A1* | 4/2019 | Starsinic ................ H04W 4/50 |

* cited by examiner

Game Controller I/O Device

Piloting Joystick I/O Device

Multi-input Joystick I/O device

Car emulation I/O device

Virtual Reality I/O Device

Augmented Reality I/O Device

1

SYSTEMS AND METHODS FOR SECURE, LOW BANDWIDTH REPLICATED VIRTUAL WORLDS FOR SHARED SPACE COMPUTING

CROSS REFERENCE TO RELATED APPLICATION

This non-provisional application claims the benefit of provisional application No. 62/854,232, filed May 29, 2019, same title, which application is incorporated herein in its entirety by this reference.

BACKGROUND

The present invention relates to systems and methods for a computing architecture focused on deep collaboration between teams of users inside a 3D shared space. Such systems and methods allow for improved performance across the shared environment, particularly by ensuring there is fidelity between each of the different users' shared experience.

Many of the operating systems that are still being used were fundamentally designed thirty years ago, when the internet was nascent, and computing hardware was orders of magnitude less powerful than the hardware available today. The operating systems of the day were thus designed around these features: 1) each device was presumed to be fundamentally alone, and segregated from other devices, and 2) computational burdens were things to be minimized at all cost.

What resulted were operating systems that were non-portable, locked into specific environments that included a number of limitations to reduce computational overhead. Further, late bound programming languages, such as LISP and Smalltalk, were frowned upon due to their relatively slow speeds.

Since then, however, there has been an explosive increase in processing speeds, and graphical processor speeds in particular, which is underutilized by most current operating systems. The increased processing speeds have also made late bound languages viable for more real time applications than was previously possible. Further, the omnipresence of reliable and fast broadband internet illustrates the shortcomings of the traditional operating systems in terms of their portability and share-ability across user groups.

Users strongly desire to collaborate in a shared environment. Whether this is a shared gaming experience, work sandbox, augmented reality (AR) shared space, or other shared virtual space. Applications exist that allow for some of this functionality, but these existing systems are required to operate within the confines of legacy operating systems, resulting in a number of limitations. Generally these application based approaches scale badly when involving very large numbers of users. One of the reasons for this is the very large bandwidth requirements required by such systems. Traditionally, the shared environments are computed at a central server and renderings of the environment are provided to each end user. This requires a significant transfer of data to each user, resulting in bandwidth limitations.

Another hurdle for these traditional approaches is the client/server cost and complexity involved in developing and maintaining these simulations. Again, since the simulation/environment is centrally computed, the server side computing requirements expand exponentially as additional users are involved. Thus costs for the server end can rapidly spiral out of reach of many developers. Likewise, there is introduced a single point of failure, which must be managed by intermittent outages, or an equally expensive redundancy system to avoid unwanted down time.

A final hurdle of these traditional shared space applications is the high degree of latency involved. Server side and user interaction latency dramatically limits a user's experience, resulting in virtually unusable remote rendering for mobile and wearable AR.

It is therefore apparent that an urgent need exists for a new architecture that allows for improved shared virtual experiences that are near infinitely scalable, low bandwidth and maintain perfect fidelity. Such systems would result in significantly reduced latencies through the usage of decentralized and secure message reflectors.

SUMMARY

To achieve the foregoing and in accordance with the present invention, systems and methods for a shared virtual environment are provided. Such systems and methods enable highly scalable, low latency and minimal bandwidth environments that are highly portable across all devices.

In some embodiments, the systems and methods include a unique architecture where domains known as "islands" are replicated across various local machines. These islands include objects that have a state and behavior. Objects may also include parts and publish events. These events include internal messages to a given island, and external messages that are provided from the island's controller, to a reflector for the addition of a timestamp. The timestamp ensures computational synchronization between all mirrored islands.

The timestamped messages are provided from the reflector back to the controllers of the various islands. The controllers incorporate these messages into the existing message queue based upon the message timing. The local machines then execute the messages in time order, until the external message indicates. These timestamp "heartbeats" thus dictate the execution activity across all islands and ensure synchronization of all islands.

The reflector is capable of being dynamically relocated in order to minimize overall system latency and to increase system security. The reflector may be locally located with a single machine, preferentially located next to a dominant local machine, or optimized in order to keep the total latency for the group as low as possible while ensuring that the latency at any given local machine is below a threshold of 150-200 ms. Latency is defined as a "digital distance" that includes round-trip ping and rendering latencies.

Reflector relocation can occur when an event occurs (such as the addition or loss of a local machine) or may be periodic (every 2 seconds to 3 minutes). Periodic relocation also has a benefit related to security. The entire system may leverage end-to-end encryption, so the reflector has no access into message content. Relocation determination is likewise kept secret from the reflector, thus even if there were a bad actor at the reflector attempting to deduce information based upon network traffic, the reflector would never remain stable enough to provide this hypothetical bad actor any useful information.

In addition to latency reductions, the disclosed systems and methods allow for reduced overall bandwidth via batch processing messages within given time window thresholds (10 ms windows for example) and through the usage of pseudo-heartbeat internal timing messages that are derived from the external messages. These may be offset from the external timing messages by 25 ms for example, thereby reducing the need for more frequent external messages.

In yet additional embodiments, the disclosed systems and methods may include the ability to deploy a persistent virtual world that enables continual time progression, even when not connected by a local machine. The persistent server periodically saves the island information enabling rapid synchronization once the local machine reinitializes the environment.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
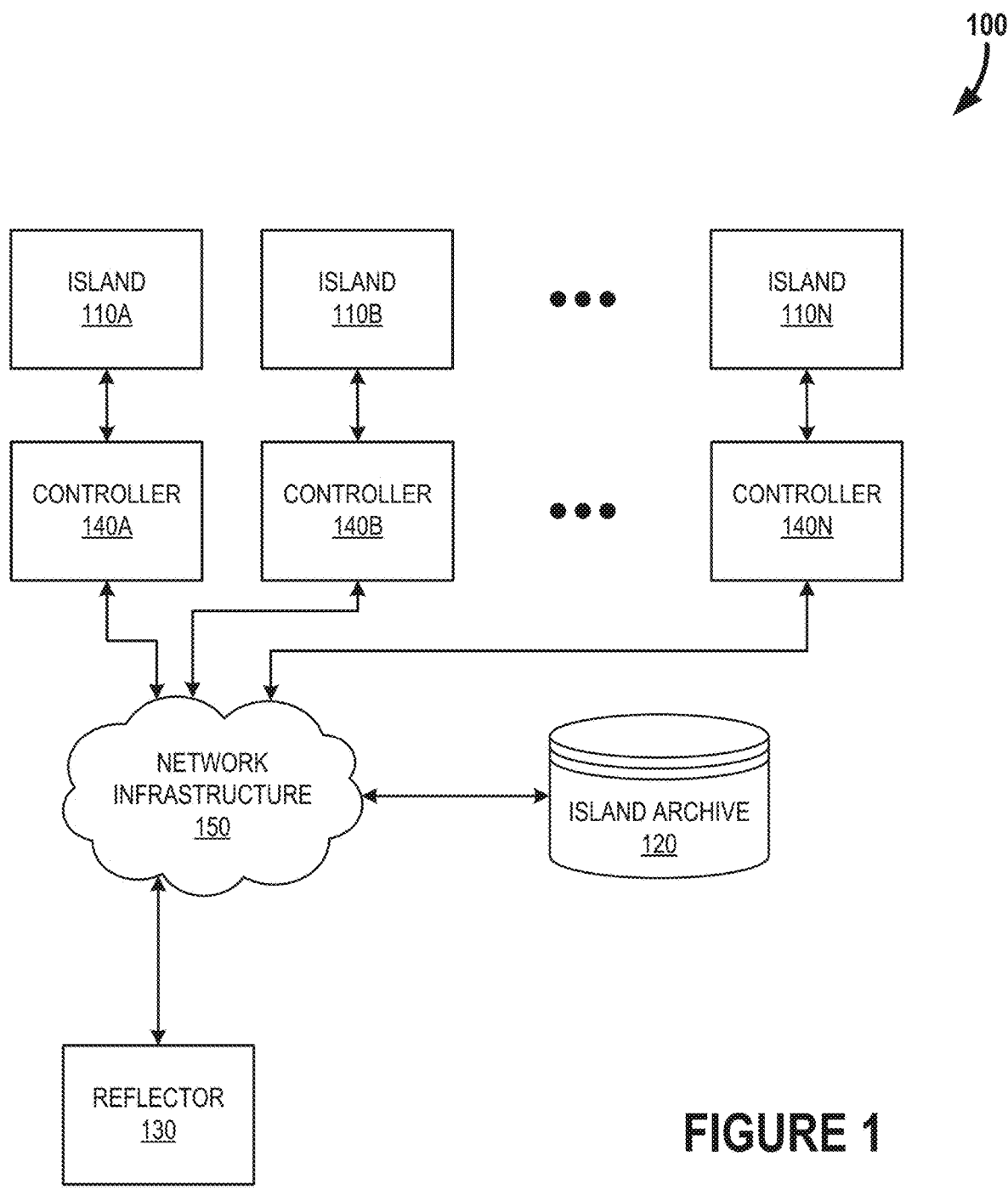
FIG. 1 is an example logical diagram of a system for a shared virtual environment, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

The following systems and methods are for a highly collaborative three-dimensional shared environment. Such environments are low latency, low bandwidth and nearly infinitely scalable without the high expense associated with server driven architectures. Further, these environments, through the reflection of messages between the various local machines involved in the shared space, offers perfect environment fidelity that is ideally suited to massive multi-user mobile use cases, shared AR environments, and work environments where perfect fidelity is a requirement.

The architecture for this shared environment is also platform agnostic, being able to be shared across any device. This ultra-portability enables sharing with virtually any other person, regardless of device they are using or platforms deployed on the device.

I. Shared Environment Overview

As noted previously, traditional sharing of environments involves a centralized server model where the "world" is computed on a backend server, rendered in the central server, and renderings are delivered to the individual users via the internet. Such systems essentially "live stream" a video feed from the backend system, and suffer significantly from bandwidth concerns, latency, and extreme server related costs (e.g., limited scalability).

In other traditional systems, the world is still computed on the backend server device, but here updates to the world are then sent to the clients which in turn locally render the view that is presented to the user. While still bandwidth intensive, and costly in terms of backend server requirements, such systems have a marginal improvement over a centrally rendered system in regards to these issues. However, latency can be a significant issue for this type of system, as well as a reduction in fidelity between the users' views.

The present disclosure focuses on a new approach to a shared virtual environment. In this architecture inputs are bound to, and sorted by, a lightweight reflector that guarantees that all copies of the world stay in bit perfect synchronization. In turn, rather than having a central server computing the 'world' local machines independently administer to their perfect fidelity copy of the shared 'world'. Computations are locally performed, and the messaging to ensure that each world copy is synchronized require minimal bandwidth requirements.

These systems and methods provide for a minimal server footprint, with virtually no server compute costs. Likewise, there is no server code required: the clients define the environment, and the reflector servers function only in a time-keeping manner. This decentralized operation allows for the system to be any size and distributed wherever it is desired (including on edge systems or the like). Latencies are minimized significantly below the current methodologies, and bandwidths are likewise a fraction of what a current shared environment requires.

Additionally, by not relying on a centralized backend server, there can be near instant server migrations allowing for latency improvements (as noted before) and security enhancements. Indeed, security and privacy are a built in feature of these systems and methods, as will be discussed in greater detail below.

In order to more clearly describe the architecture enabling these shared environments, attention will now be turned to definitions that will assist in understanding the attendant figures and descriptions. The present architecture relies upon "objects" that are located within the "islands" running on each local computer. These 'objects' each include a state and a behavior. An object can publish events, subscribe to events, and request future events. An object lives in a "domain". The domain assigns an ID to each of its objects, and manages their subscriptions. An object may have "parts". Part IDs are managed by the object. The object itself is a part, too. In some embodiments, an object and its parts can be addressed using a hierarchical URL scheme.

There are "local domains", "shared domains", and "remote domains". A domain contains a collection of objects. The domain manages subscriptions for these objects. A local domain (a.k.a. "client") contains "view" objects. View objects only exist on the user's machine. View objects publish events in response to user input, and generate output in response to events to which they have subscribed. If they request a future event, it is published relative to local wall clock time.

A shared domain (a.k.a. "island") contains "model" objects. An island is isolated from all other domains. An island has an internal clock that only advances when receiving external timestamped events. Future events generated on the island are relative to the island's internal clock. Much of the following discussion will focus on these shared domain islands.

A remote domain (a.k.a. "service") is only defined by its events. The disclosed systems and methods make no assumptions about a service's internal structure. This could be a database server, web service, etc.

Objects within the same domain may communicate directly (e.g., by method calls), or by publishing of and subscribing to events. Objects in different domains can only communicate via "events". Publishing an event informs the objects subscribed to that event. The publishing object may attach data that is sent along with the event. Publishing an event has no side-effects on the publishing object: there is no observable difference in behavior whether there are subscribers to that event or not.

Subscribing to an event means to register a handler to be invoked when that event is published. If the publishing object attached data to the event, the handler will receive that data when invoked. The handler typically is a method of the subscribing object, the data is passed as an argument.

Events are published to a "scope". The scope can be an arbitrary string, but typically is the URL of an object or part, in some embodiments. When subscribing to an event, a scope needs to be specified, too. Only events published to that scope will cause that subscriber's registered handler to be invoked.

When subscribing to a shared domain's events, that domain's objects, their subscriptions, and future event requests (collectively called an island) are replicated to the user's machine. That means, a snapshot is taken of the current state of the island, which is sent via the internet to the user, and the island is recreated from the snapshot. To further facilitate the discussion, FIG. 1 provides an example logical diagram of a system for such a shared virtual environment 100, in accordance with some embodiments. Here there are a series of shared domain islands 110a-n each coupled to one or more controllers 140a-n a reflector 130 and an island archive 120 via a central network infrastructure 150. Islands 110a-n can be easily saved in the island archive 120 database. Likewise, islands may be readily duplicated between different computational devices.

The network 150 is depicted as a network cloud and as such is representative of a wide variety of telecommunications networks, for instance the world wide web, the internet, secure data networks, such as those provided by financial institutions or government entities such as the Department of Treasury or Commerce, internal networks such as local Ethernet networks or intranets, direct connections by fiber optic networks, analog telephone networks, through satellite transmission, or through any combination thereof.

The reflector 130 plays two major roles. First, it acts as the clock for the replicated islands in that it determines when an external event will be executed, as will be discussed in greater detail below. These external events are the only information an island 110a-n has about the actual passage of time, so the island 110a-n simply cannot execute any pending messages in its message queue until it receives one of these time-stamped external messages. The second critical role played by the reflector 130 is to forward any messages it receives from a particular controller 140 to all of the currently registered islands 110a-n. Reflectors 130 can be located almost anywhere on the network and need not be collocated with a particular island 110a-n.

The controller 140a-n is the non-replicated part of the island/controller pair. While the controller 140a-n and each island 110a-n are shown separate in this example diagram, it is entirely possible these two components are functionally co-located within a single local computational device. The role of the controller 140a-n is to act as the interface between the island 110a-n and the reflector 130 and between the user and the island. Its main job is to ship messages around between the other parts of the system. The controller 140a-n also manages the island's message queue, by determining when messages will get executed, as will be described in greater detail below. In some embodiments, a controller 140 can exist without an island 110a-n, acting as a proto-island until the real island is either created or duplicated. In this case it is used to maintain the message queue until either a new island is created or until an existing island is replicated.

Figure 2:
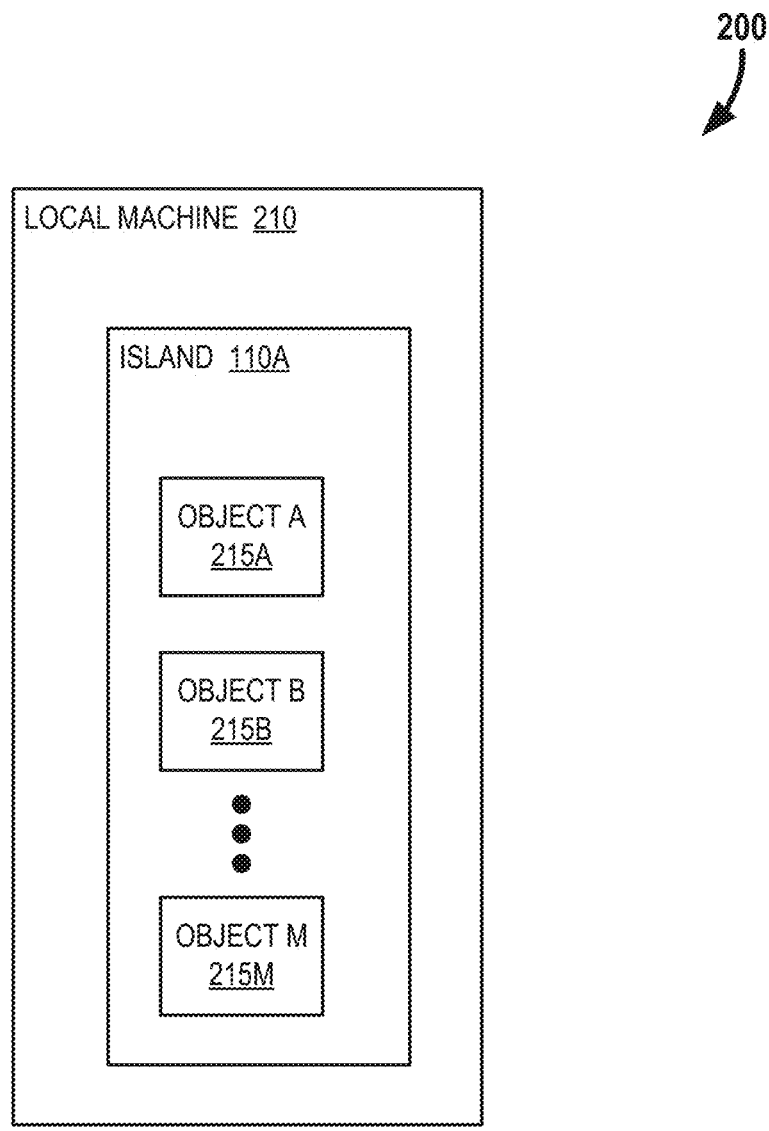
FIG. 2 is an example logical diagram of local machine, in accordance with some embodiments.

Turning to FIG. 2, an example illustration is provided of the local machine 210 which is embodying the local island 110a. Within each island 110a-n are a series of objects 215a-m. As discussed, objects 215a-m include a state and a behavior, may include parts, and can publish events, subscribe to events, and request future events.

Each of the islands 110a-n runs independently on the local computer 210. Each island calculates the operation of objects 215a-m within the island 110a, and generates a rendering for the attendant user. The islands 110a-n operate in replication to one another based upon synchronization messages provided from the reflector 130, as will be discussed in significant detail below.

Figure 3:
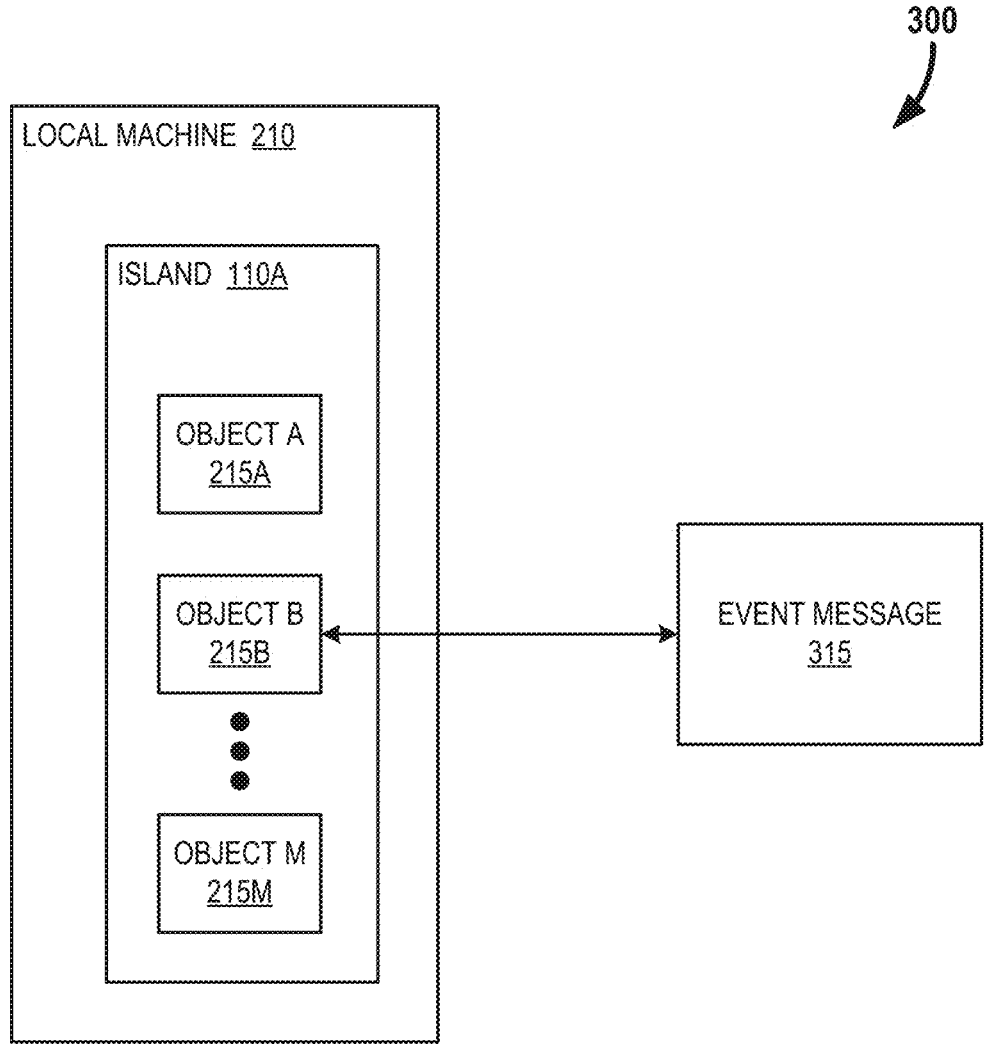
FIG. 3 is an example logical diagram of local machine in communication with an event message, in accordance with some embodiments.

Moving to FIG. 3, it can be seen that objects 215a-m within a given island 110a can only be accessed by reference externally, whereas between objects in the island messages may be sent between the various objects directly. An external event message 315 is used whenever an object is externally accessed. By default, subscription handlers for events published in the same domain are invoked synchronously, just like a direct method call. This makes them very efficient since no buffering is required. In contrast, subscription handlers for events published in a different domain are invoked asynchronously. That means the events are buffered, and only after the code in the publisher's domain has finished running, the queued events are processed. (In a multi-threaded environment, processing of the queued events could start concurrently).

Figure 4:
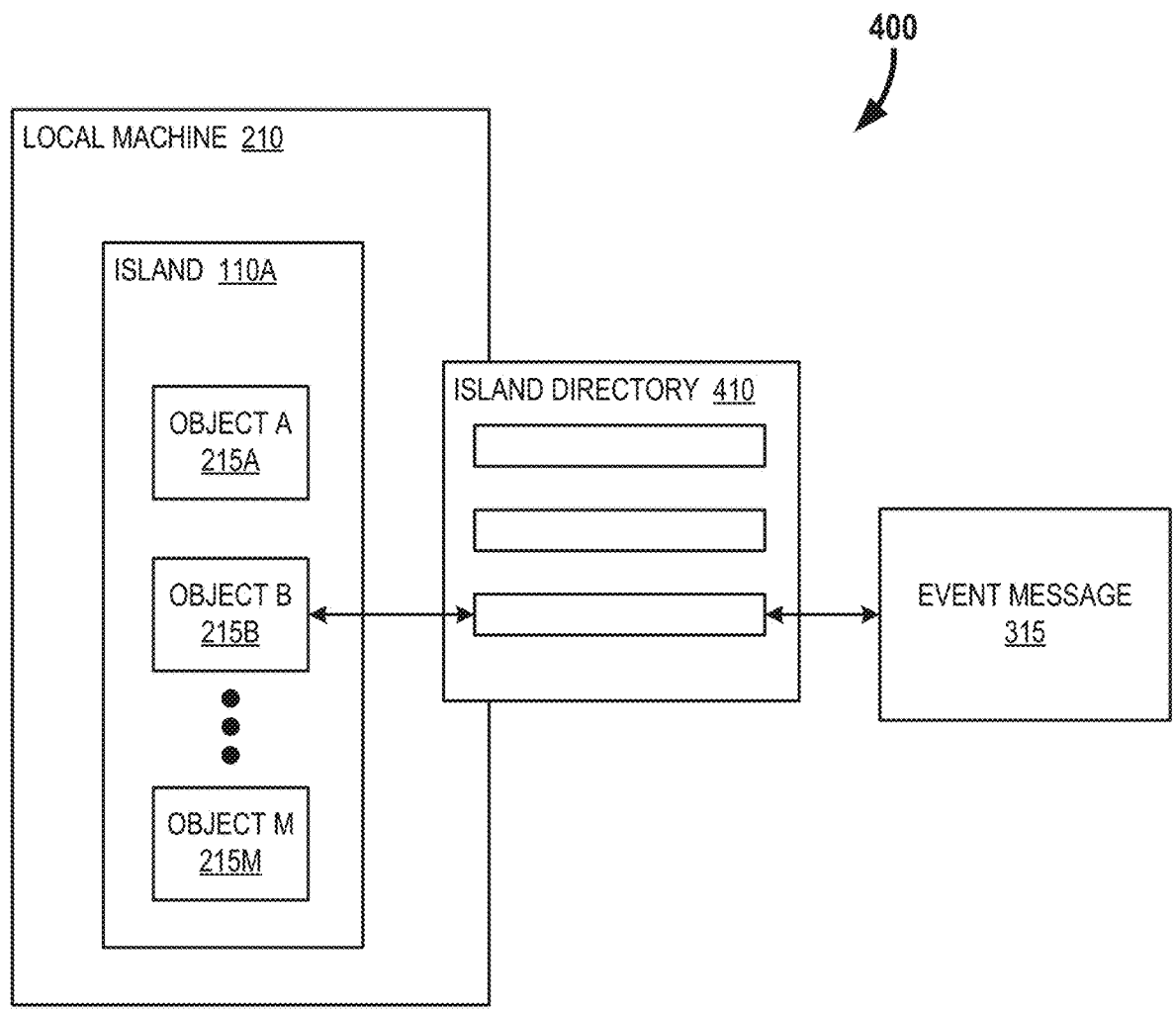
FIG. 4 is an example logical diagram of local machine with an island directory, in accordance with some embodiments.
Figure 5:
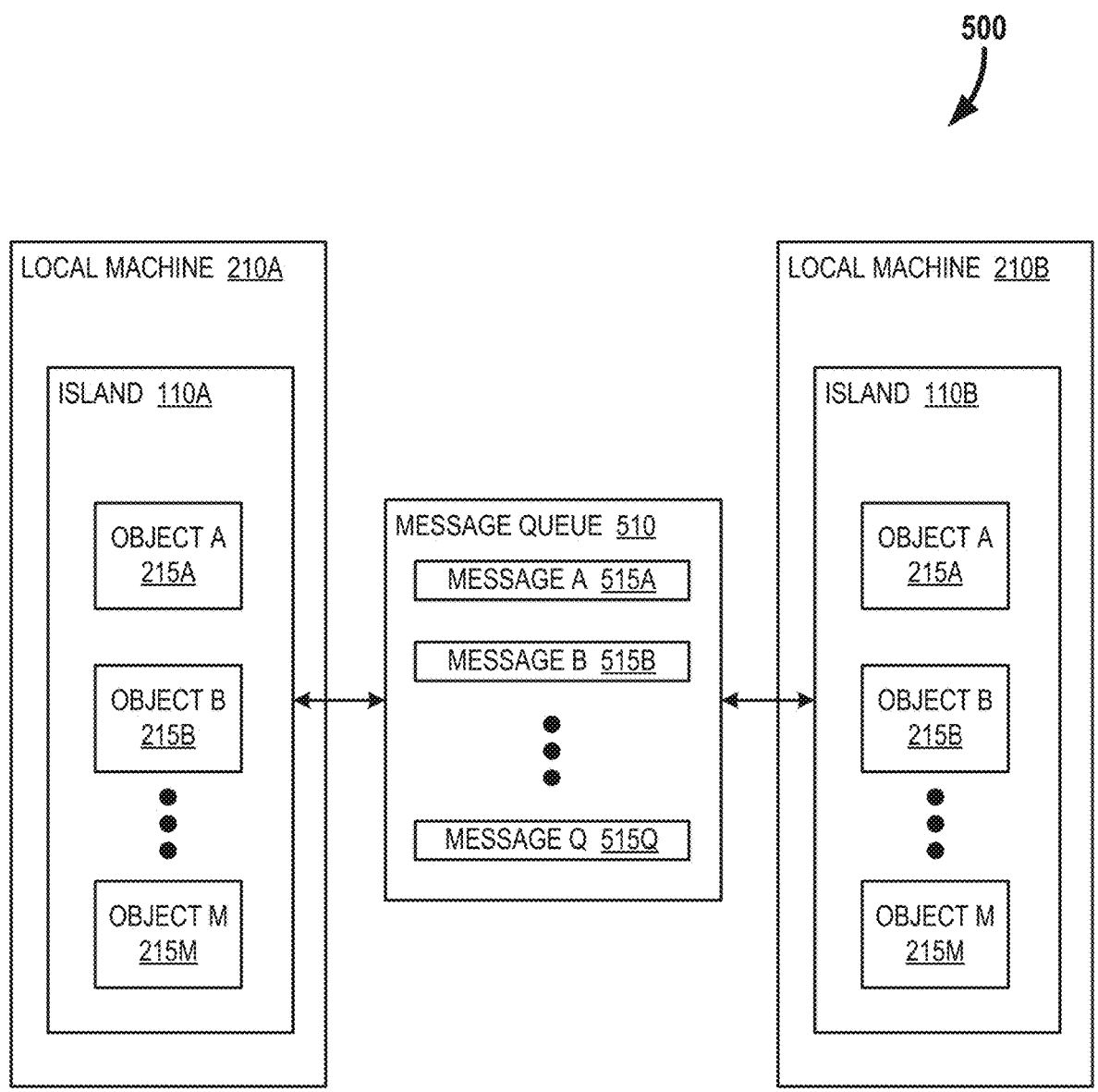
FIG. 5 is an example logical diagram of two local machines in communication with a message queue, in accordance with some embodiments.

Turning to FIG. 4, an example of this queue of events is provided, at 400. The island 110a maintains a list of the named objects in a directory 410, which is accessible externally. The messages may thus be sent indirectly to the object 215a-m in the island 110a via the event message 315. However, rather than rely upon event message 315, in some embodiments it is significantly more efficient to directly replicate events between the various islands. For example, turning to FIG. 5, two local machines 210a and 210b respectively, are communicating via a message queue 510 that includes a series of messages 515a-q which are executed in each island 110a-n in order.

The replicated islands are deterministically equivalent, and are replicated via a checkpoint mechanism that will be discussed in greater detail below. All internal future messages are implicitly replicated, and all external future messages are explicitly replicated. The island structures remain identical, resulting in identical results between the islands.

Figure 6:
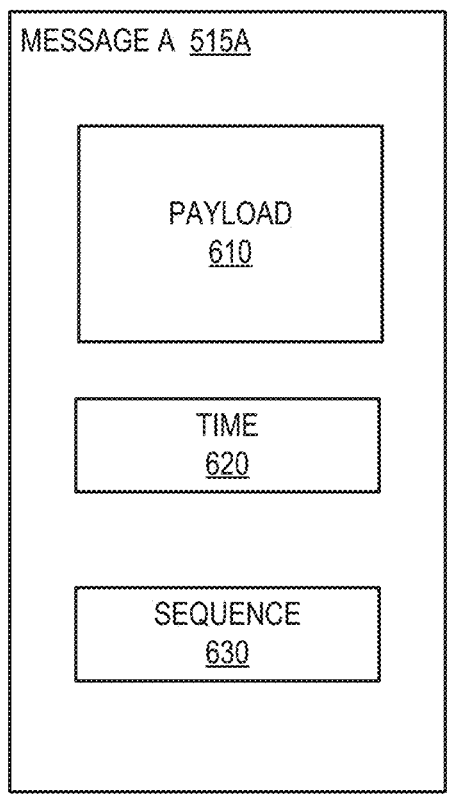
FIG. 6 is an example logical diagram of a message, in accordance with some embodiments.

The messages 515a-q are ordered in the message queue 510 in order of time. An example of a message format is provided in greater detail in relation to FIG. 6. Here it can be seen the message itself is relatively lightweight, resulting in minimal bandwidth overhead. The message 515a includes a payload 610, which may include the target, the message itself, and attendant arguments. The message likewise includes the time 620 and sequence 630. The target indicates which object the message relates to. The message itself is the action taken (e.g., to rotate the object for example). The argument is the condition of the message. For example, if the message is to rotate the object, the argument may indicate the number of degrees or direction in which the object should be rotated. The sequence 630 element is used to order the messages within the queue 510, and therefore determine when the actions of the message are executed. The time 620 is appended by the reflector, and is used to progress execution of messages in the local machine. Messages can be generated either internally, as the result of the execution of a previous message inside of an island, or externally, as the result of an external event usually generated by one of the users of the system.

There is virtually no difference between internally and externally generated messages as far as the internal execution of the island is concerned. A major difference between the two is that the timestamps on externally generated messages are used by an island to indicate an upper bound to which the island can compute its current message queue without danger of computing beyond any possible pending messages.

The definition and manipulation of time plays the central role in how the system is able to create and maintain a replicated island state. The system must be able to guarantee that every internally generated message will be executed in exactly the proper order at exactly the proper time. Externally generated messages must be properly interleaved with the internally generated messages at exactly the right time and order. In order to achieve this, when a new message is generated, it is inserted in the sorted queue based upon its execution time.

Figure 7:
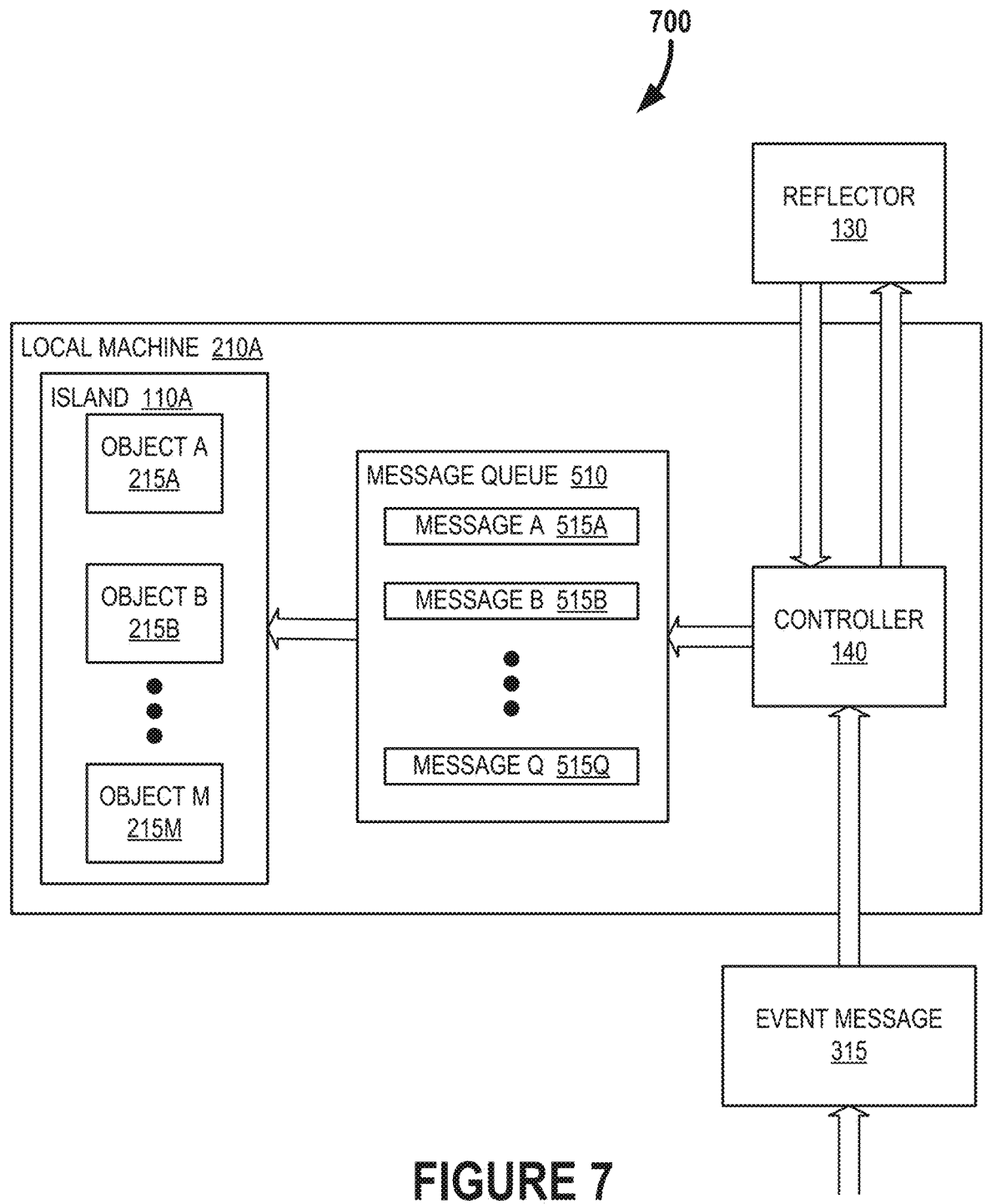
FIG. 7 is an example logical diagram of a local machine operating in conjunction with a controller and reflector in response to an external event message, in accordance with some embodiments.

Turning now to FIG. 7, a logical diagram 700 for the replication of an event is provided. At this point, the island 110a-n replica's state is identical to the original island. The state can only change in response to external events (here the event message 315). The controller 140 manages the flow of external events into the island. The controller 140 connects to the reflector server 130. All replicas of an island 110a-n connect to the same reflector 130.

When an event is published outside of an island 110a-n, and an object inside the island is subscribed to it, the island's controller 140 sends the event to the reflector 130. The reflector 130 puts a timestamp on it, and relays the event to all controllers 140 for all replicas of that island, including the originating controller (hence the name, "reflector"). When the time-stamped event is received from the reflector 130, it is sorted into the island's future event queue 510. Then the simulation is advanced to the event's time stamp. If no event is sent to the reflector from any client within a certain time frame, the reflector manufactures a "heartbeat" event to advance time in the replicated islands.

Figure 8:
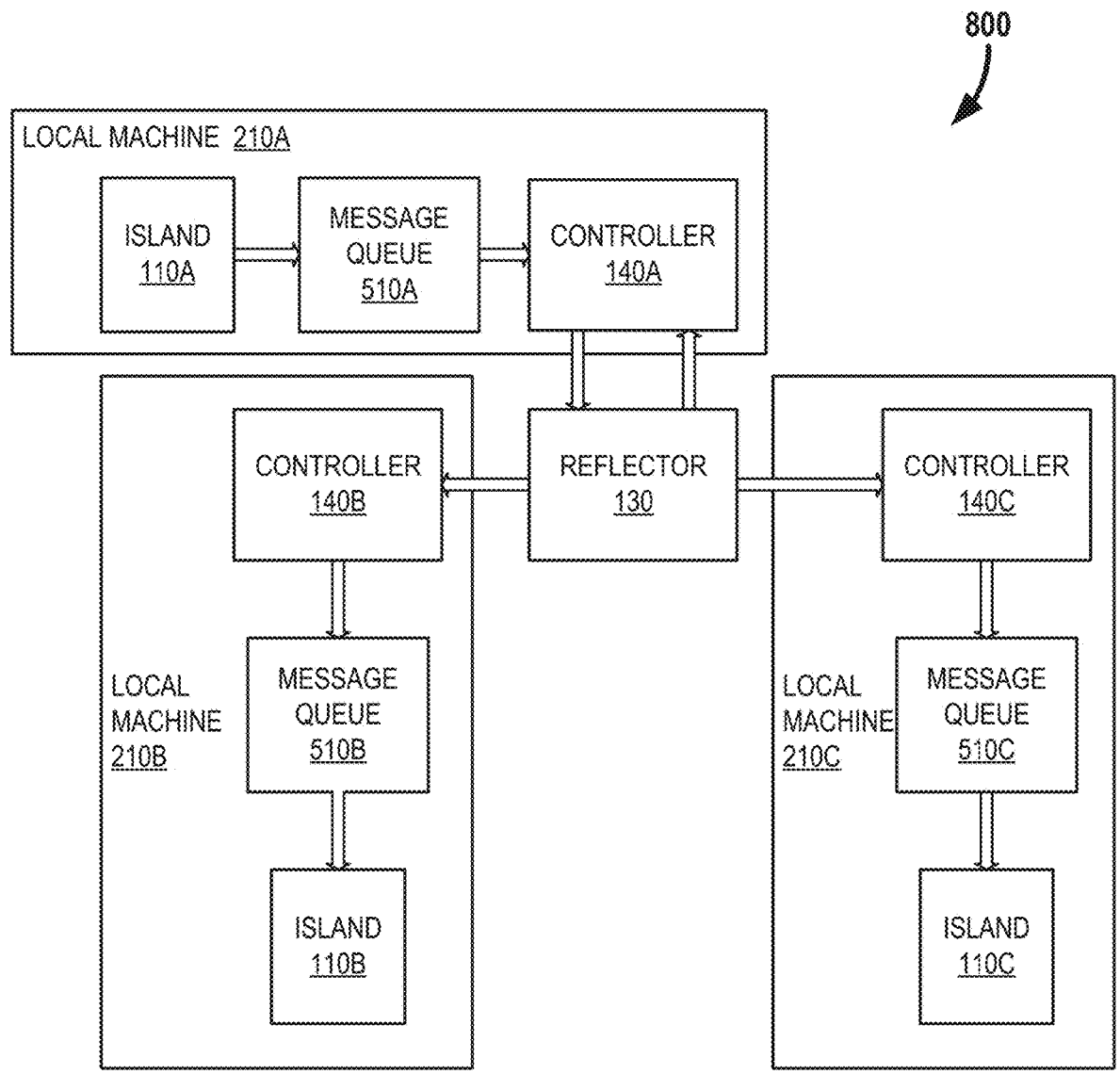
FIG. 8 is an example logical diagram of three local machines synchronizing through a reflector, in accordance with some embodiments.

While this process is illustrated in relation to a single island in reference to FIG. 7, the same process occurs when there are multiple islands with objects subscribed to the same event, as seen in FIG. 8. In this example, local machine 201a includes an island 110a that includes an event that is to be replicated across the other islands. This message is sent via the controller 140a to the reflector 130. The reflector 130 provides a unique timestamp to the message, and returns to the original controller 140a as well as all other controllers 140b and 140c that are mirroring the island. Each of the three controllers 140a-c provide the message to their corresponding message queue 510a-c, respectively. The message is ordered within the queues based upon the timestamp, and the messages are executed in time order in each local machine 210a-c in their respective island 110a-c.

As the state of each island 110a-c was initially identical, and the messages were distributed to each island and executed synchronously, the resulting environments in each island will continue to be identical.

An island's view of time is defined only by the order of the messages it has in the internal queue 510. Islands can only respond to external, atomic, time-stamped messages. These messages are literally the island's clock. Though islands have internal time based messages that can be queued up, these cannot be released for computation until an external time based message has been received which indicates the outer temporal bound to which the island can compute. Thus, even when there is a large number of internal messages ready to be executed, they remain pending until an external time stamped message is received indicating that these internal messages are free to be computed up to and including the newly received message. Each island's message queue is processed by a single thread, so issues with improperly interleaved messages do not arise.

When a message is executed, the time remains atomic in that it does not advance during the execution of this message. The "now" of the message stays the same. When a future message is generated during the current message, the new message always defines its execution time in terms of the current "now" plus an offset value. This offset should generally be greater than zero (though in fact zero is an acceptable value in certain circumstances, it should generally be avoided because if it is infinitely iterated, the system can't advance and will appear to freeze.) If multiple future messages are generated, they will have an identical "now", though they may have different offsets. If two messages are generated at the same "now" and with an identical temporal offset value, an additional message number is used to ensure deterministic ordering of the messages. All this ensures perfect fidelity between mirrored islands.

All of the messages in the island queue are "future" messages. That is, they are messages generated as the result of the execution of a previous internal message with a side effect of sending messages to another object at some predefined time in the future, or they are messages that are generated as the result of an external event—usually from a user—that is posted to the island to execute at some point in the future, usually as soon as possible. All of these messages have time stamps associated with them. The internal messages have time stamps that are determined by the original time of the execution of the message that initially posted the message plus the programmer defined offset. The external messages have a time that is determined by the reflector and is set to a value that is usually closely aligned with an actual time, though it doesn't need to be.

As noted previously, internal future messages are implicitly replicated; they involve messages generated and processed within each island replica, so they involve no network traffic. This means that an island's computations are, and must be, deterministically equivalent on all replicas. As an example, any given external message received and executed inside of a group of replicated islands must in turn generate exactly the same internal future messages that are in turn placed into the islands' message queues. The resulting states of the replicated islands after receipt of the external message must be identical, including the contents of the message queues.

Likewise, external future messages are explicitly replicated. Of course external messages are generated outside of the scope of an island, typically by one of the users of the system. The replication of external messages is handled by the reflector 130 as seen previously.

External non-replicated messages are extremely dangerous and are generally avoided. If a non-replicated message is executed and happens to modify the state of an island it breaks the determinism the island shares with the other replicated copies. This can be extremely detrimental to system fidelity, except in when rendering the contents of an island, but this is extremely well controlled to avoid any breakage of determinism.

Each island has an independent view of time that has no relationship to any other island. For example, a given island could have a speed of time (relative to real time) that is a fraction of another. This is useful for collaborative debugging, for example, where an island can actually have a replicated single step followed by observation by the peers.

Since time is atomic and the external messages act as the actual clock, latency has no impact on ensuring that messages are properly replicated and global island state is maintained. Higher latency users have a degraded feedback experience as a result, but the replication does not suffer in any manner.

II. Replication Methods

Now that the general systems for a replicated collaborative shared environment are have been provided in considerable detail, attention will be turned to processes employed to enable this replicated architecture.

Figure 9:
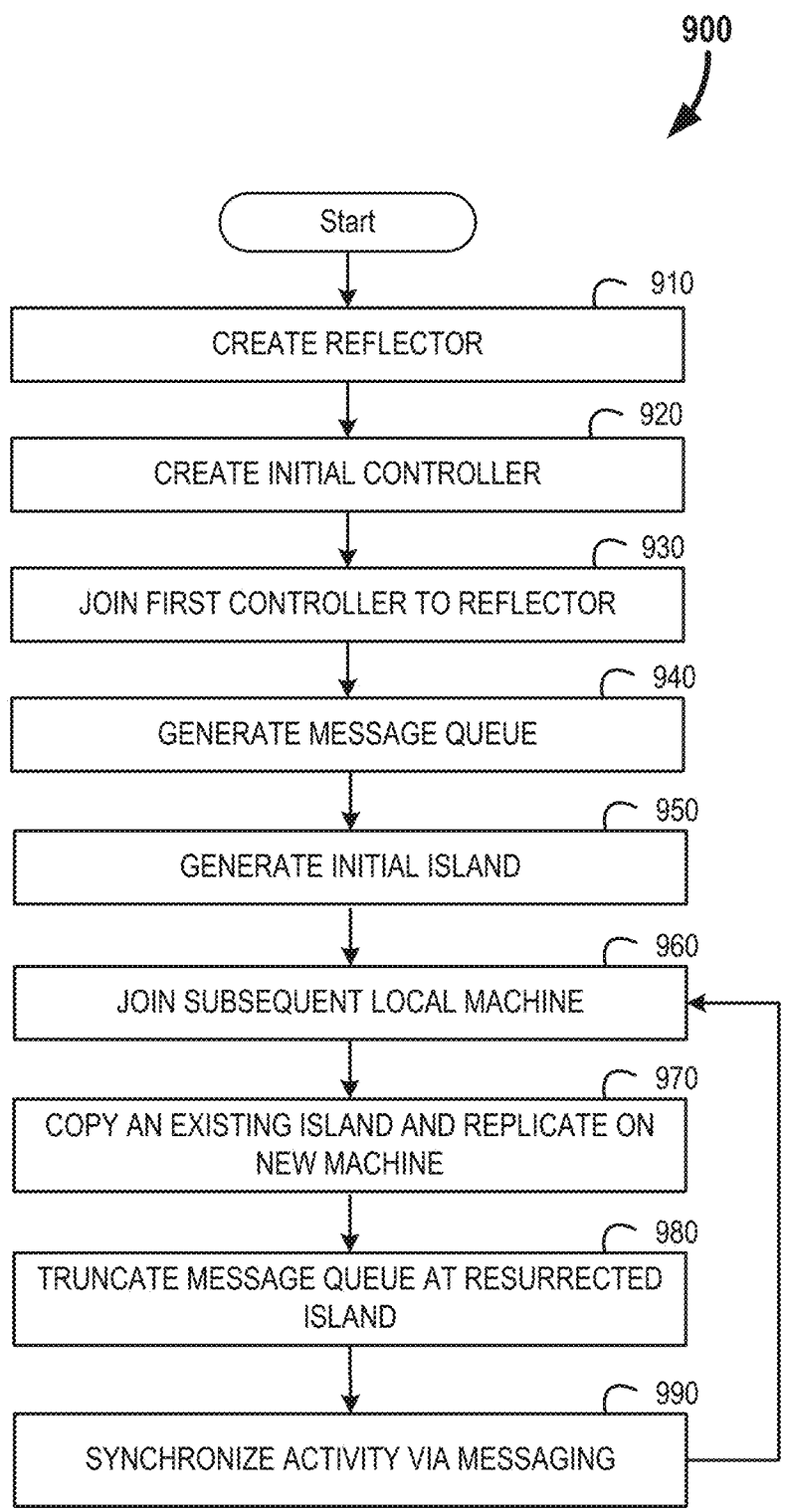
FIG. 9 is a flow diagram for an example process of generation of a shared virtual space via reflection, in accordance with some embodiments.

Turning to FIG. 9, a flow diagram 900 for an example process of generation of a shared virtual space via reflection is provided. In this example process, initially a reflector is created (at 910). The local machine initializing the process will generally host the initial reflector, but this reflector may be dynamically updated in the future as is desired for latency balancing and/or enhanced security purposes. Alternatively, the reflector can be on any accessible machine on the network—either remotely on a WAN, locally on the LAN, or on the same machine that will act as host to the original island. Reflectors are extremely lightweight objects, so they really don't take up many resources, either in space or computation. The reflector has a network address and port number that is how we will find it later.

Subsequently an initial controller is generated as well (at 920). The new controller is generally on the local machine of the user. It can be provided the reflector's address and port number. The initial controller joins the first reflector (at 930), and creates the initial message queue (at 940) by publishing its message stream to the controller. The only messages coming from the reflector at this point are the heartbeat messages—assuming the reflector has been configured to generate these. In any case, the controller is designed to simply begin adding these messages to its message queue. This is actually important when joining an already existent replicated island, because in that case many of the messages that get sent and stored on the queue will be necessary to bring the island replica up to date after it is replicated locally. Joining is view only access. At this point, even if there were an island, the user is not allowed to send messages that might modify it in any way.

Figure 10:
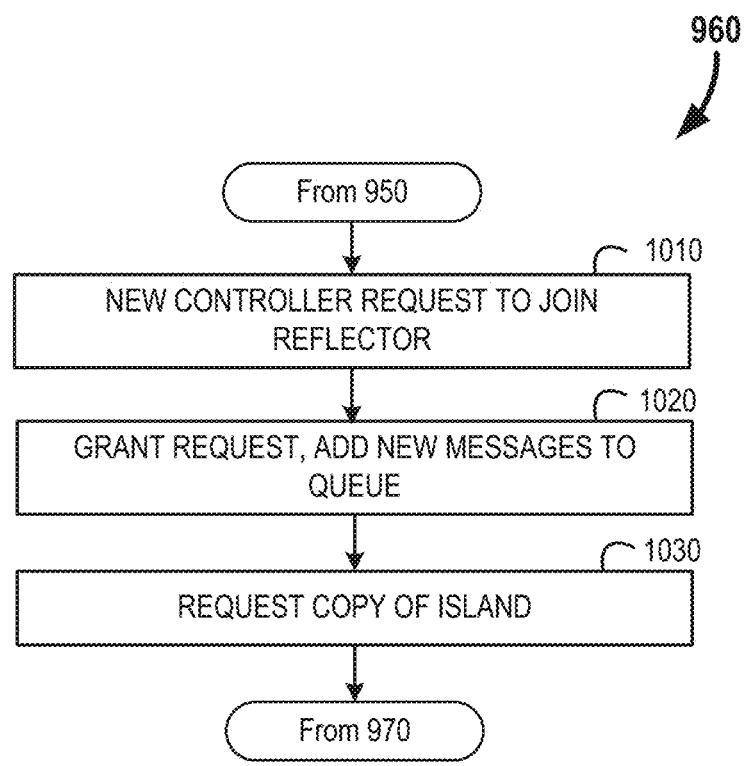
FIG. 10 is a flow diagram for an example process of the joining of a new local machine, in accordance with some embodiments.

Only after the initial queue has been generated is the initial island generated (at 950) by the controller. The user is able to populate the island and have objects within it begin sending their own internal messages to the message queue. This initial island may operate alone for as long as desired. However, when an additional user wishes to join the shared environment, a subsequent local machine needs to join the island network (at 960). FIG. 10 provides a more detailed diagram of this sub-process of subsequent machine joining.

Initially the new controller for the subsequent local machine makes a request to join the reflector (at 1010). The reflector grants the request, and adds messages to the queue of the new controller (at 1020). The controller requests a copy of the island from the reflector (at 1030), which completes the joining process. Returning to FIG. 9, a copy of the initial island needs to be generated, which is then replicated onto the new machine (at 970). Importantly, the message queue for the new machine is then truncated down to the event of the replicated island copy (at 980). This truncation ensures that extraneous actions are not taken/ repeated in the newly replicated island.

Figure 11:
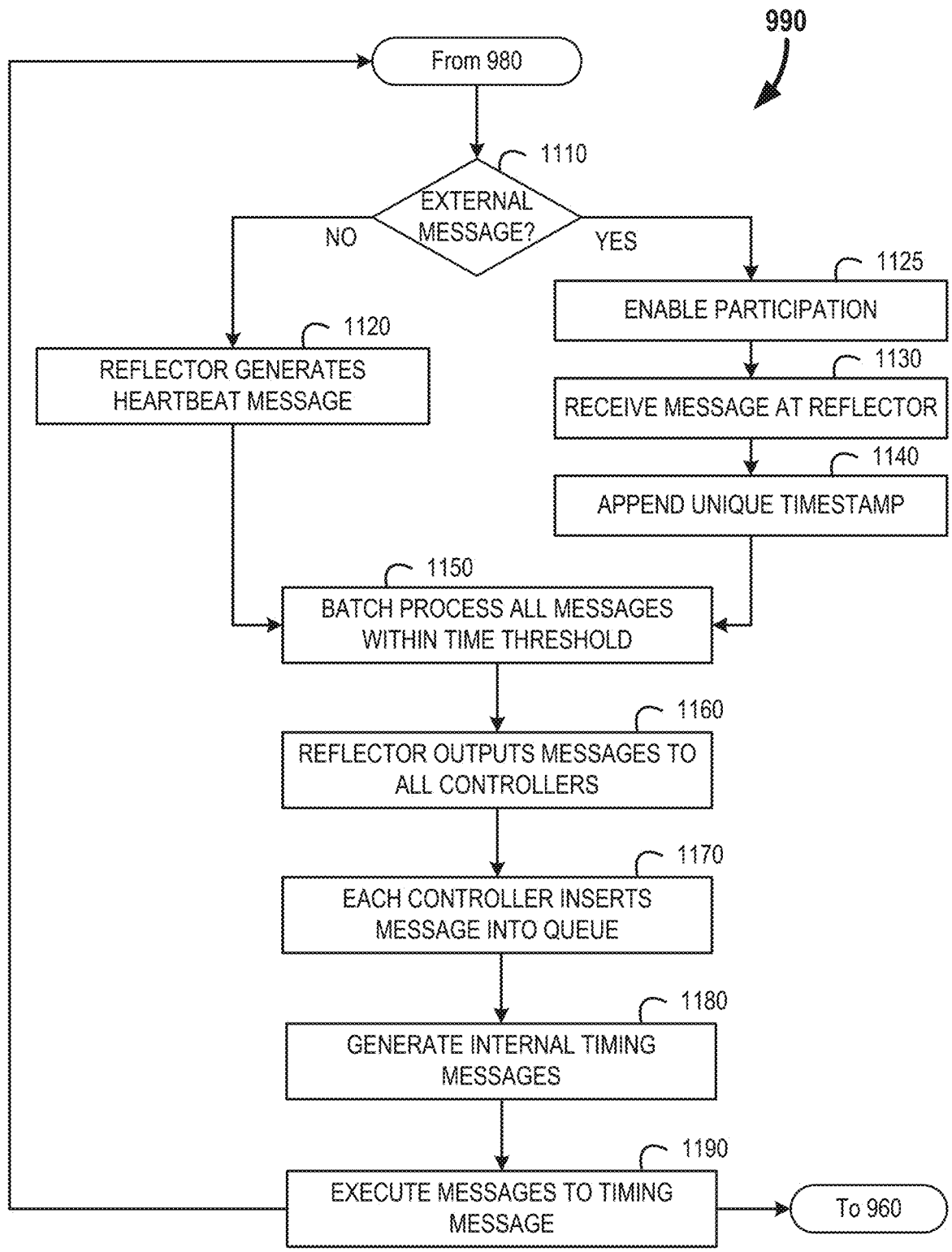
FIG. 11 is a flow diagram for an example process of the synchronizing of the islands, in accordance with some embodiments.
Figure 12:
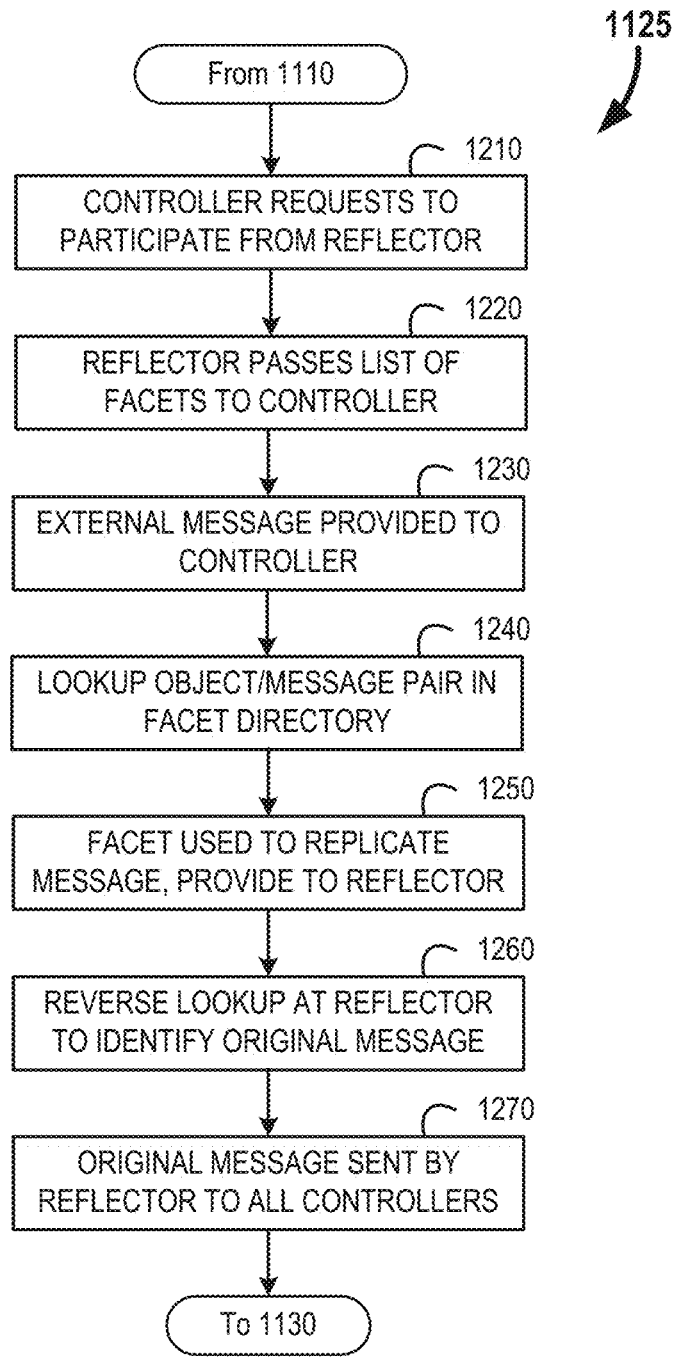
FIG. 12 is a flow diagram for an example process of the participation enablement, in accordance with some embodiments.

Lastly, the activities between the islands progress in synchrony (at 990) which is described in greater detail in relation with the process of FIG. 11. In this example process, initially a determination is made if the message is external or not (at 1110). If it is an internal message, the reflector can generate a heartbeat message (at 1120) since internal messages are unable to progress time (as previously discussed). If it is an external message however, the process must ensure that the local machines are all enabled to participate (at 1125). FIG. 12 describes this participation enablement operation in greater detail. It begins with the controller requesting to participate to the reflector (at 1210). The reflector passes a listing of facets to the controller (at 1220), and the external message is then provided to the controller (at 1230). Each facet dictionary is unique to a controller/ island pair. Each user may have a different sized dictionary, corresponding to either more or fewer capabilities granted. The controller cannot send a message if it is not in the facet dictionary, thereby ensuring that only trusted users have the ability to modify a given state in the replicated islands.

The controller performs a lookup of the object/message pair in the facet directory (at 1240) and the facet is used to replicate the message. This replication is then provided back to the reflector (at 1250). At the reflector, a reverse lookup is performed to identify the original message (at 1260), and this original message is sent by the reflector to all controllers (at 1270).

Returning to FIG. 11, after enabling participation of the controllers, the external message is received at the reflector (at 1130), and a unique timestamp is appended to the message by the reflector (at 1140).

Regardless of whether the message is an external message with a timestamp appended, or a simple heartbeat message, the reflector outputs the message to all controllers (at 1160). Optionally, the reflector may collect all messages received in a given time window/threshold and batch process these messages before outputting them to the controllers (at 1150). Batch processing in this manner may cause some approximations in event timing, but for a small enough window these artifacts are not noticeable to a user and cause no degradation in the perceived experience. The benefit of such batch processing however, is a further reduction in required bandwidth, which may be advantageous in a mobile environment or other circumstance with limited connectivity bandwidth.

After the messages have been received by the controllers, they are inserted into the queue at each local island (at 1170) based upon their timing. The messages in the queue may then be executed at each island in sequential order based upon the timing (at 1190). Prior to the step, however, it is also possible to generate internal timing messages based upon the received external message timing (at 1180). These internal "pseudo-heartbeat" signals may be utilized to reduce the dependence upon external heartbeat signals, thereby even further reducing bandwidth requirements.

Synchronization/processing of messages in time order is an ongoing process, and repeats as long as an island is active. Additionally, the system is able to add additional users at any time a new local machine is able and authorized to join the mirrored group.

It should be noted that in each island are 'portals' which are the main access to the various islands. Portals can (but are not required to) be overlaid on top of each other. For example, an island portal may overlay a user interface portal and system control portal, in some embodiments. Portals can include user interface objects used to manipulate content of an island as well.

Islands may also include specialized objects known as 'ghost objects' which are objects that do not actually exist inside the island but behave as if they do. These objects actually exist in a separate island that is accessed by an overlay portal. Examples of these ghost objects could include window frames, user interface handles, billboards, and portals connecting one island to another island. Thus, while islands cannot directly connect to one another they can still appear to be directly connected and act as if they are.

Like ghost objects, another specialized object is a 'reference object' which likewise does not exist within the island. These reference objects are not typically replicated, nor reused across multiple islands. These objects are utilized to render scenes for example. Other examples of reference objects include Tforms, OpenGL objects, and any kind of non-replicated object that an island may require.

As noted before, rendering is not a replicated event. Rendering occurs locally on each machine, and does not leverage a future message. Write protection may be employed to ensure that the island state is not modified by the rendering process (or any other non-replicated event).

III. Performance Optimizations

While the basic architecture of mirrored islands provided in the above sections already has significant advantages over server hosted shared environments in terms of latency, bandwidth and scalability, the proposed systems and methods may be further optimized to provide additional latency and bandwidth advantages. For example, as previously mentioned, by batch processing the messages within a given time window, and by leveraging "pseudo-heartbeat" messages that are internally derived from the external timing messages, the present system is able to further reduce bandwidth requirements.

As noted previously, because no messages are ever lost, and because the original message senders cannot specify when a message is to be executed, latency does not create timing or synchronization problems, just feedback problems. Systems will act sluggish if you have a higher latency, but the contents of the Island will remain identical between all users regardless. This also means that users are not punished for having a high-latency participant sharing an island, though the high-latency participant may have a less than satisfactory experience.

Although latency does not change the island outcome, or punish the overall group, further reducing latencies still increases the usability of the system. Additional improvements in the systems operation are possible to enable ultra-low latency, and exceptionally secure environments. These added benefits are realized via the ability to dynamically reposition the reflector either in response to a stimulus (e.g., addition of a new local machine to the island group), or based upon a predetermined or pseudo-random time. Since reflectors are independent of island/controller pairs, they can be positioned anywhere on the network. This means that they can be moved to a position of minimal group latency, or onto centralized balanced latency servers. Reflectors can even be moved around if necessary to improve latency for specific users or groups of users. For context, most users are not aware of latency of less than 150 ms. Thus, in some embodiments the system may have a latency threshold of 150 ms, including round trip ping and rendering time.

FIGS. 13A-E provide example scenarios of reflector placement that enable specific latency goals. The main contributor to latency is "digital distance". This is determined by adding up all the time spent in all of the paths that the message must traverse to and from the user. This includes such things as Wi-Fi connection, cellular connection (can be lossy which requires multiple resends), network congestion, buffering, packet loss, time spent within routers, optical fiber connections, copper wire, etc. The Internet is composed of a vast array of different vehicles for transmitting information and each has a cost in the time it uses. The simplest way to look at the problem is by actual physical distance as this tends to have a reasonably good relationship to the latency of a round trip message. A further addition to latency is the time it takes to render a scene that is in response to a user action.

In each of these example figures, there are defined three "digital distances" 1310A-C where the reflector 130 may be positioned, for the sake of simplicity. As noted, these "locations" may correspond roughly to physical distance of a reflector's location, but does not necessarily mean so. For example, locations with excellent network connectivity (such as between Silicon Valley and Seattle) may have a lower "digital distance" than between two closer, but less 'connected' locations (e.g., Silicon Valley and Sacramento).

Figure 13A:
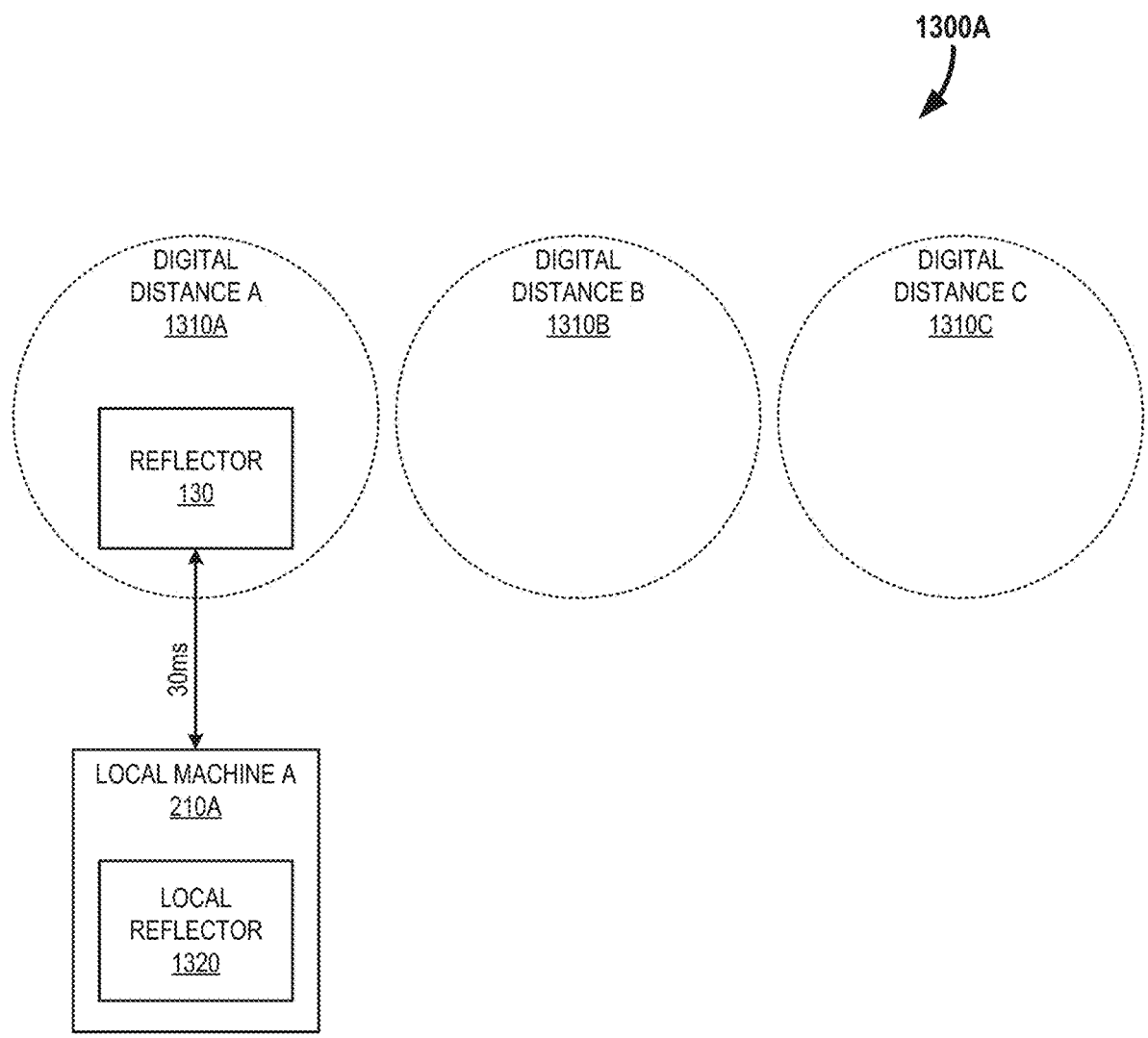
FIG. 13A is an example logical diagram of a first local reflector position selection, in accordance with some embodiments.

In the initial FIG. 13A, as seen at 1300A, a single local machine 210a is operating. Digital distance A 1310a has the lowest latency to this local machine 210a at 30 ms. The reflector 130 is thus located at location A 1310a in this embodiment. Furthermore, as there is only a single local machine involved here, it is also possible to have the reflector running locally 1320 in the local machine 210a, resulting in virtually no latency at all.

Figure 13B:
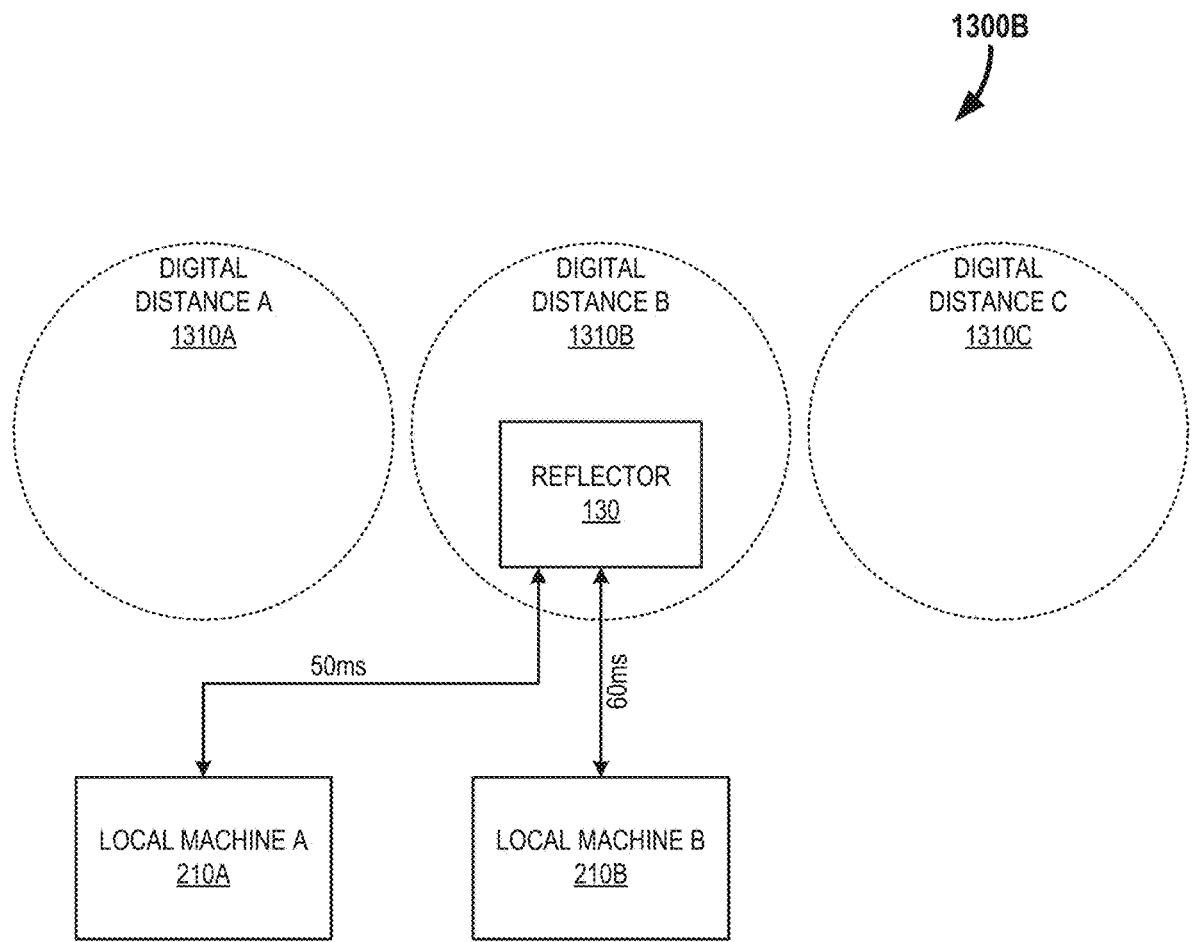
FIGS. 13B and 13C are example logical diagrams of a second reflector position selection for optimized overall latency, in accordance with some embodiments.

Once another local machine 210b is introduced, however, placement of the reflector 130 may be updated to have the lowest overall latency, and seen in FIG. 13B at 1300B. Here the reflector has moved to digital distance B 1310b. Latency for the local machine A 210a is larger than before, but still very good at 50 ms. Similarly, latency for local machine B 210b is good at 60 ms. Compared to any other location, the reflector has the lowest overall latency at for the given islands at this location.

Figure 13C:
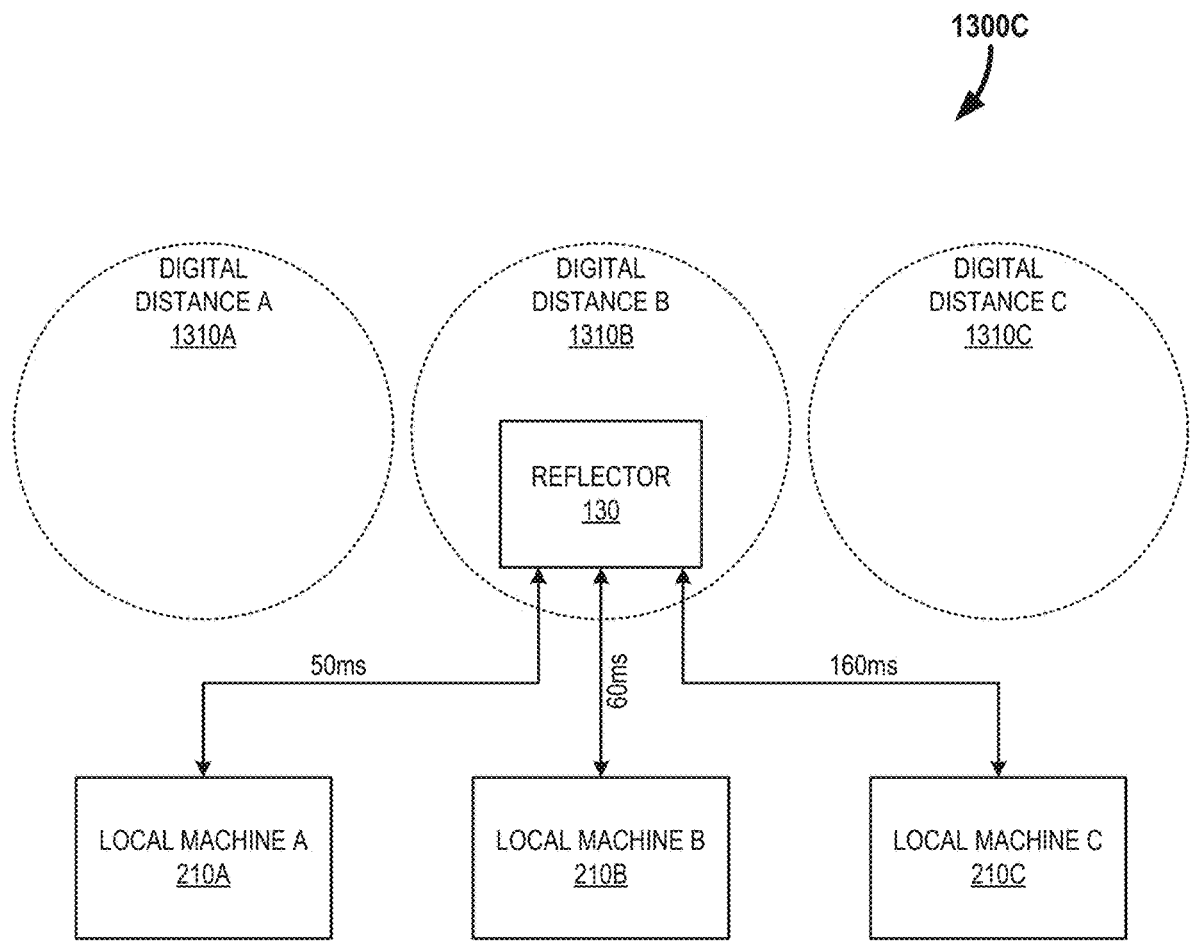

Conditions change again when a more remote third local machine 210c is introduced, as seen in relation to example FIG. 13C, at 1300C. Here, overall latency is still lowest at the second digital distance 1310b, although the third local user 210c is experiencing a significantly higher latency (at 160 ms) compared to the peers.

Figure 13D:
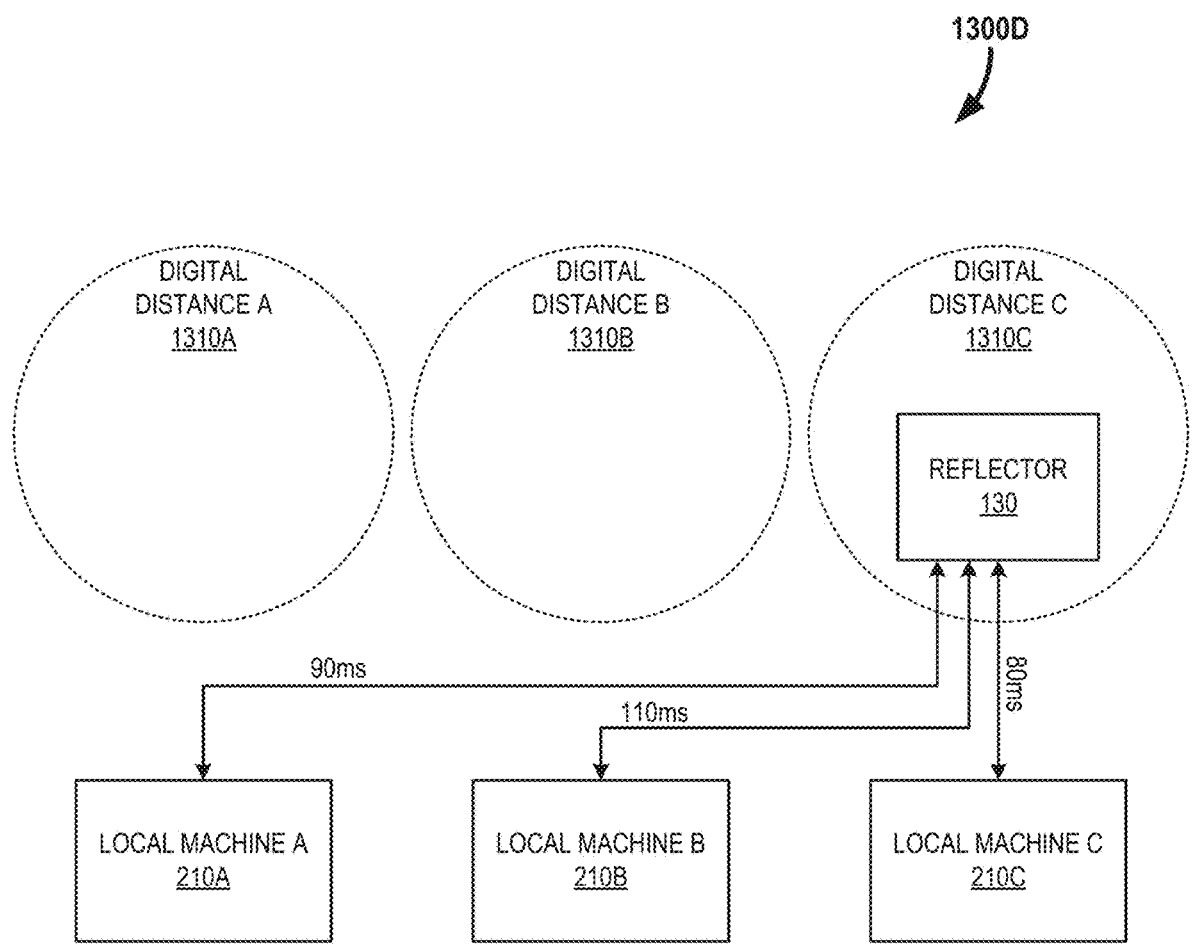
FIG. 13D is an example logical diagram of a third reflector position selection for optimized latency below thresholds, in accordance with some embodiments.
Figure 13E:
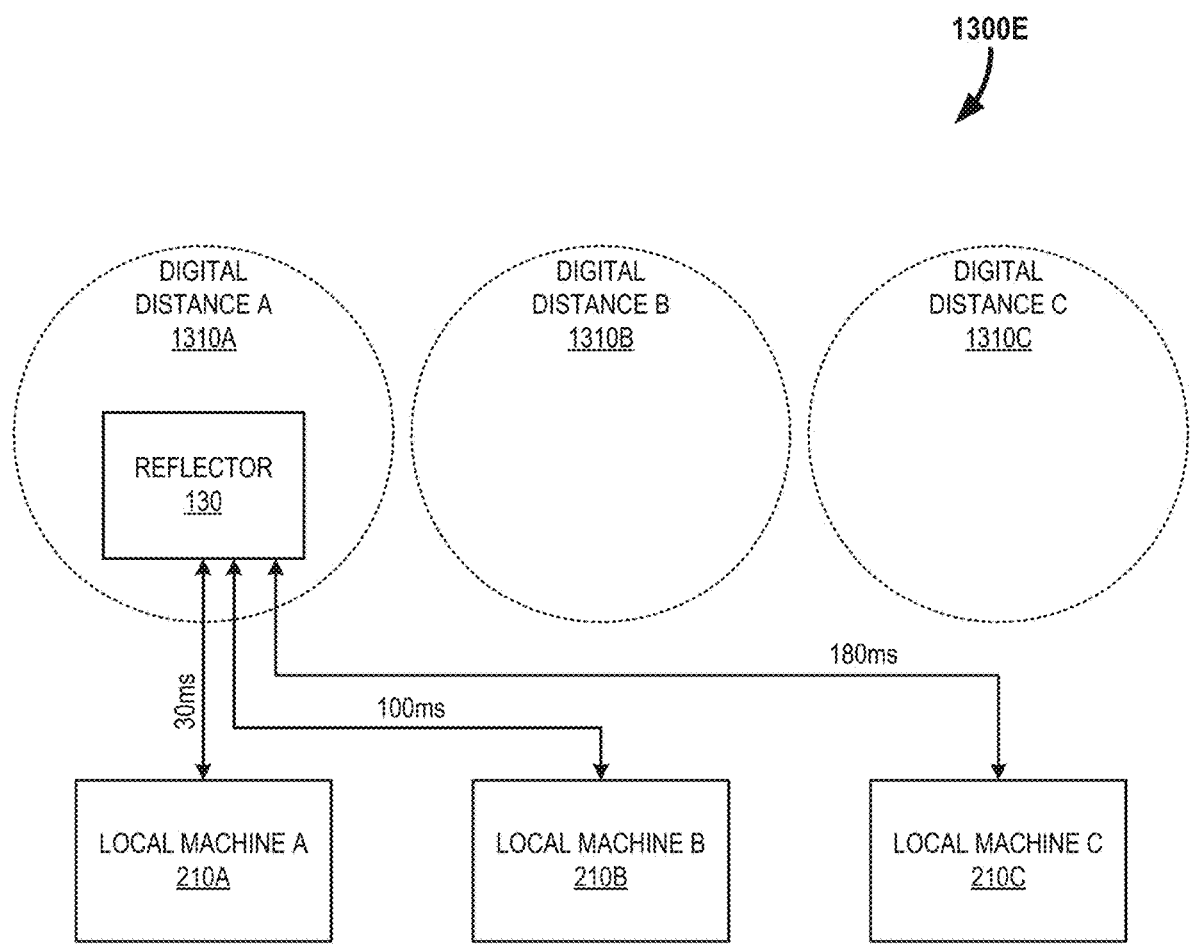
FIG. 13E is an example logical diagram of a fourth reflector position selection for optimized latency for a dominant user, in accordance with some embodiments.

In some embodiments, this latency level may be deemed unacceptable, as it is over the 150 ms threshold prescribed in some embodiments. In such systems, the reflector placement may be updated to more closely resemble what is seen in FIG. 13D, at 1300D. In this example, the reflector is now located at the third digital distance location 1310c. Latency for all local machines is now under the 150 ms threshold requirement (at 90 ms, 110 ms and 80 ms respectively). Compared to the second digital distance location overall latency across all local machines is actually higher at this location, but since none of the users are experiencing latencies over the perceivable threshold, this may still be considered a 'superior' reflector placement.

Of course, there may be circumstances when the criterion for reflector placement may not be merely the overall lowest latency, or lowest latency under the perceivable threshold. For example in FIG. 13E, as seen at 1300E, the reflector 130 has again been located in the first digital distance 1310a location, even though this results in a non-optimal (total is not minimized) latency, and there are local machines with latencies above the 150 ms perceivable threshold. What is important to note about this placement, is that here the first local machine 210a is a "dominant user" and thus even though by other measures this location has sub-optimal latency, it has the lowest latency for this 'dominant' local machine. Such a situation may be desirable when a single local machine (or a limited sub-group of machines) is responsible for most of the activity within the island, is responsible for running particular simulations, or has been designated as "dominant" upon configuration of the islands.

Figure 14:
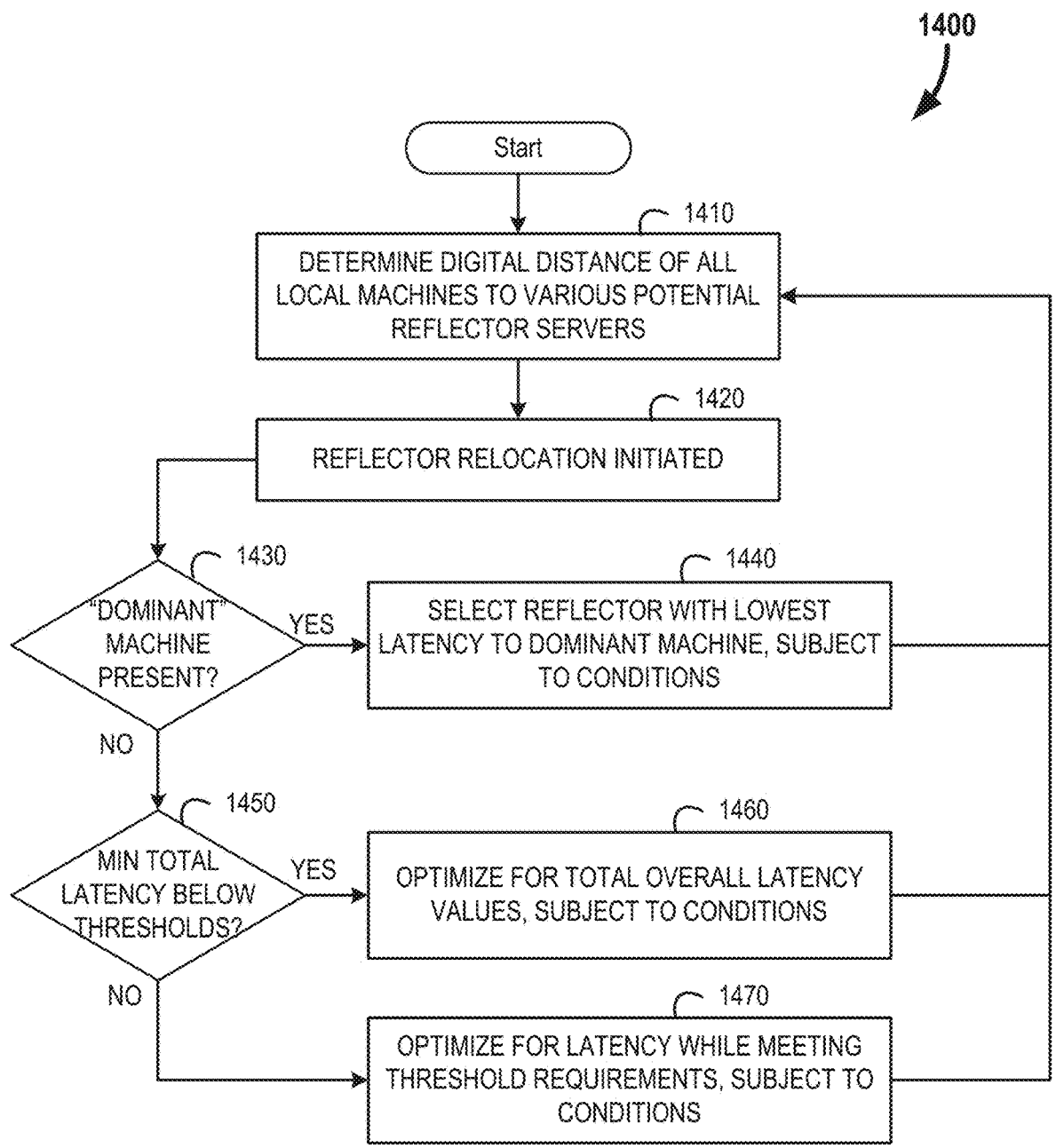
FIG. 14 is a flow diagram for an example process of reflector location selection, in accordance with some embodiments.

FIG. 14 provides a flow diagram for an example process of reflector location selection, shown generally at 1400. In this process, the digital distance of all local machines are determined as compared to the potential locations of the reflector (at 1410). At some point a reflector relocation is then initiated (at 1420). As noted before, reflector relocation is generally reserved for when a new local machine joins the island group, or may be a regularly occurring event based upon a clock or other deterministic event.

Regardless of the cause of relocation, initially an inquiry is made if such a 'dominant' machine (or group of machines) is present (at 1430). If so, then the reflector position with the lowest latency to these dominant machines is selected (at 1440). This selection may be subject to rule based conditions. For example, even though the concern is primarily for dominant users, it may be desirable not to have a latency for any other machine exceeding 200 ms.

However, if there is no dominant machine present, the next determination is (at 1450) if the location that provides the minimum total latency still provides individual latencies below the acceptable threshold (here 150 ms, although this value can be configured). If so, then the minimum latency location is ideal, and this overall latency value can be optimized for (at 1460).

However, if one or more individuals will experience unacceptably high latencies, the system may instead optimize for the lowest latency within the confines of meeting the threshold requirements for each individual machine (at 1470).

Figure 15:
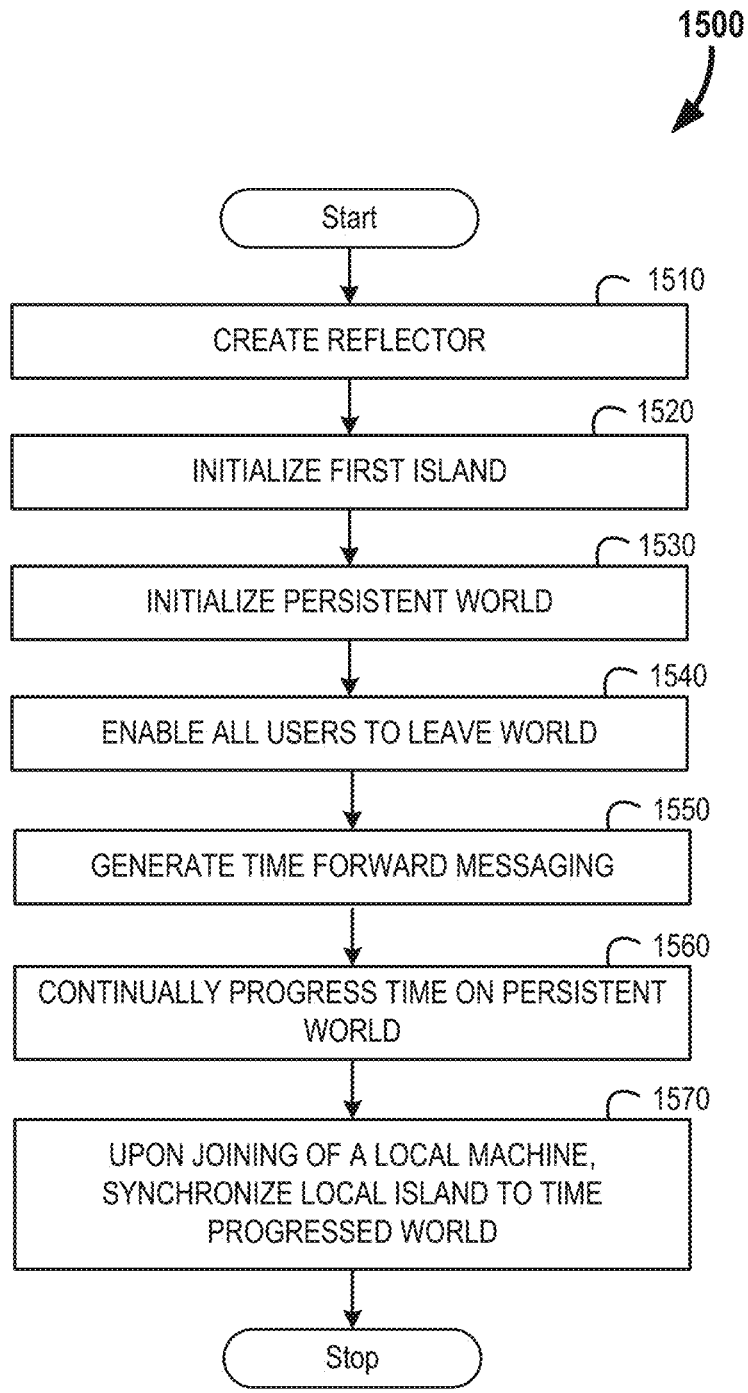
FIG. 15 is a flow diagram for an example process of administering a persistent virtual environment, in accordance with some embodiments.

In addition to improvements in session latency, the present systems and methods allow for additional benefits, including environments that have continual time passage and persistence. For example, FIG. 15 is a flow diagram for an example process of administering a persistent virtual environment, shown generally at 1500. In this example process, the reflector is created in much the same fashion as previously discussed (at 1510). Likewise the first island is initialized (at 1520). However, for this continual time environment, a persistent world is likewise initialized (at 1530). This persistent world can be a lightweight background web worker that merely provides time progression messaging, execution of actions, and periodic builds of island replicates.

This enables the users to "leave" the world (at 1540), while ensuring that the time forwarding messaging is generated regardless (at 1550). Time is thus continually progressed within the persistent world (at 1560). Whenever a local machine then joins back "into" the world, the persistent mirror can be leveraged to generate a replica and synchronize the timing of the two mirrored islands (at 1570).

Joining an ongoing session/timeline for an island can leverage the island ID. The island ID is generated by hashing all the code defining the island's behavior and the options passed into the bootstrap process. The island's controller sends this island ID to the reflector, who responds with a session ID that is based on the island ID. To join an ongoing session, another client's controller generates the same island ID (because it has the same source code) and sends that to the reflector, getting a session ID back. But instead of running the island's bootstrap code, it requests an island snapshot, and recreates the island from that snapshot.

Figure 16:
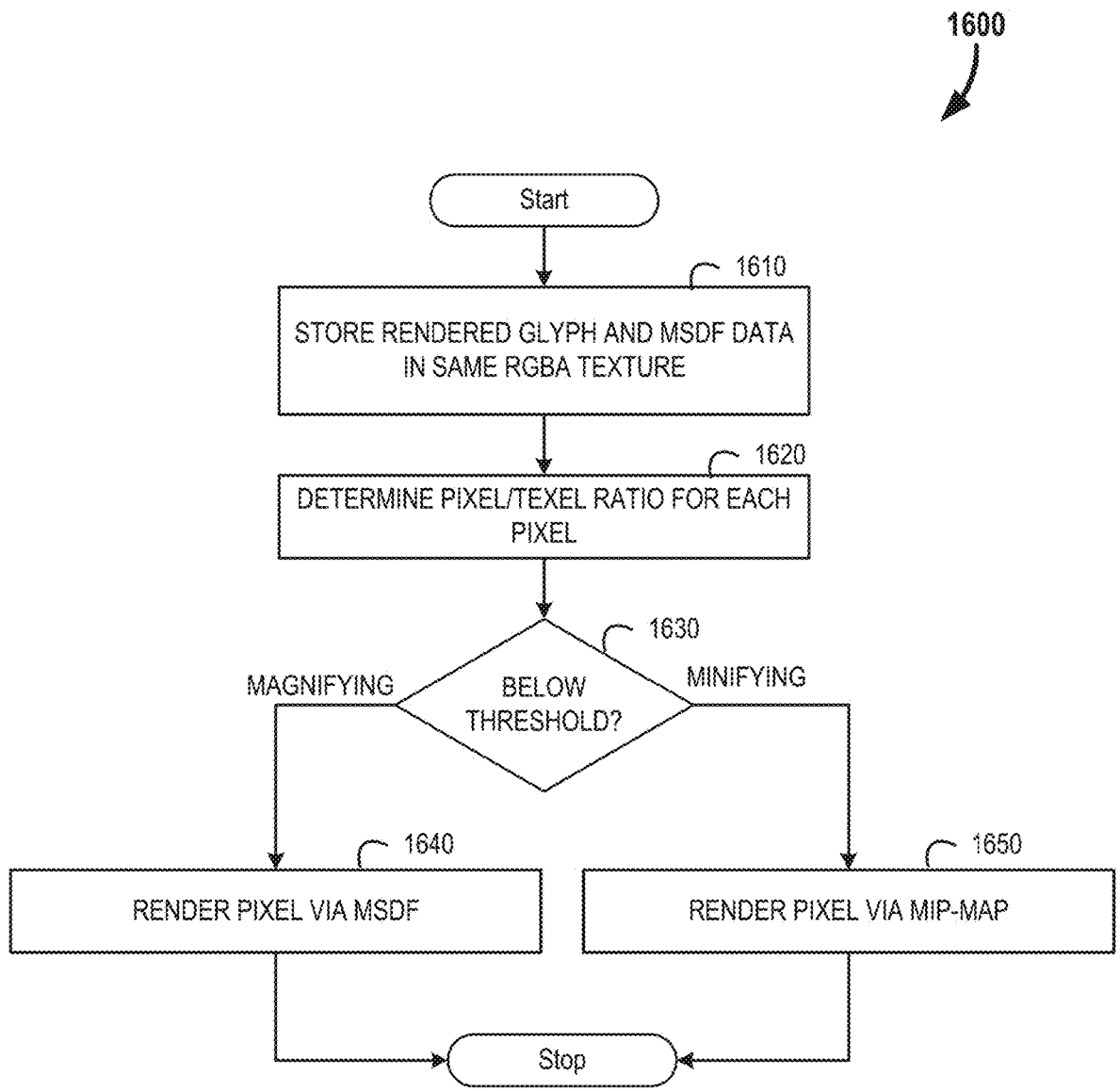
FIG. 16 is a flow diagram for an example process of improved text rendering within the virtual environment, in accordance with some embodiments.

Moving on, another improvement that is realizable in the present architecture is how text is rendered within a given island. State of the art is to leverage multichannel signed distance field (MSDF) for rendering text on a graphics processor. Unfortunately, the render quality degrades when the text size gets too small for leveraging this methodology. Given that the islands allow for objects to be rendered in virtually any size, it is important that methods are developed to address such challenges. FIG. 16 is a flow diagram for an example process of improved text rendering within the virtual environment, shown generally at 1600. This method includes storing the rendered glyph as well as the MSDF data in a single RGBA texture (at 1610). Then when the text requires rendering, the process can determine the render size by determining the pixel/Texel ratio for each pixel (at 1620) and make a determination if the render size is below a degradation threshold (at 1630) based on the font data. The fragment shader uses the partial derivative of texture coordinate to efficiently determine the on-screen rendering size.

If above the threshold (magnifying), the process can leverage the MSDF rendering techniques (at 1640), but if below the threshold (minifying), then the rendered glyph is mapped as a texture onto a 3D geometry (at 1650) to render the pixel via mipmap.

Also related to text editing, traditionally, collaborative text editing over network requires the "transformation" of user edit actions according to other users' actions. For example, "insert" and "delete" text at a specified position, along with adjusting user selection display. With the replicated computation model most of the burden to maintain the integrity of the document with multiple users issuing commands is alleviated. Specifically, the "insert" and "delete" commands don't have to be transformed, as the replicated model maintains the users' selection locations. The selection operations still have to be transformed but the number of cases of possible combinations among different types of commands are reduced from 9 ((insert, delete, select)* (insert, delete, select)) to 4 ((insert, delete)*(select)+(select) *(insert, delete)).

Figure 17:
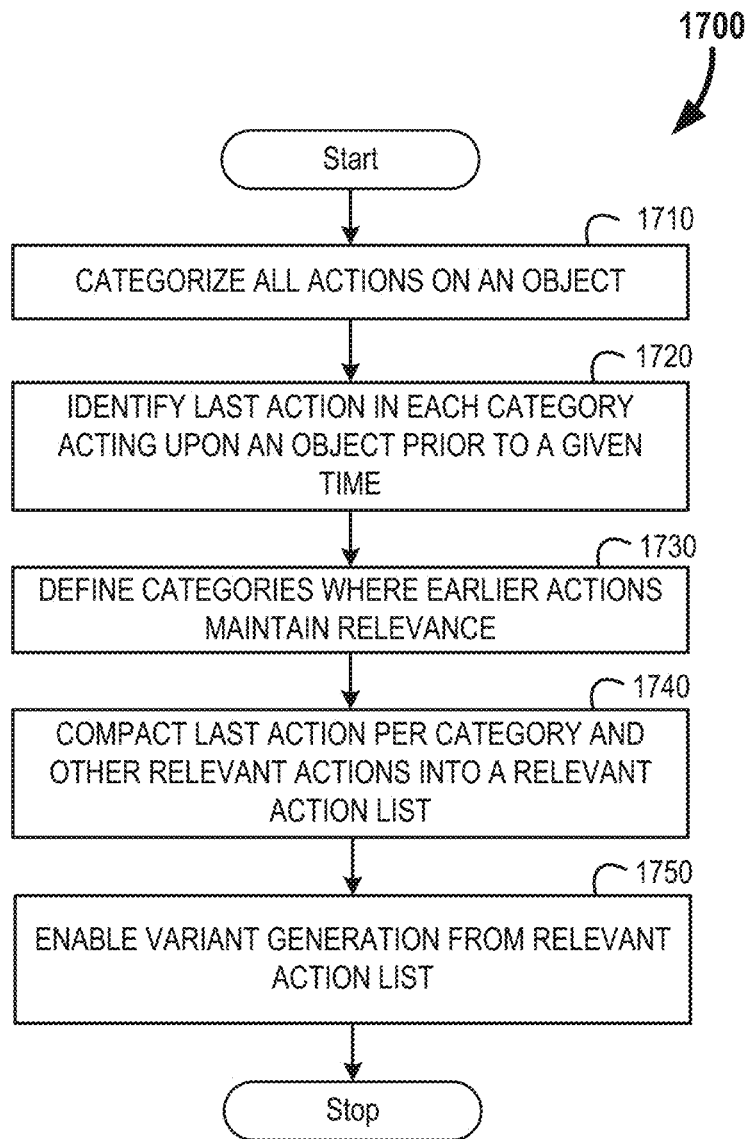
FIG. 17 is a flow diagram for an example process of action compaction within a virtual environment, in accordance with some embodiments.

Another method employable to reduce bandwidth requirements is to compress actions involved in island generation. This may be particularly useful when variants of an island are desired. Rather than laboriously replaying every step in the island's evolution from scratch, the actions may be compacted to enable more efficient deployment. FIG. 17 is a flow diagram for an example process of action compaction within a virtual environment, shown generally at 1700. In this example process, the actions are each categorized for an object (at 1710). In the case of an object representing a list of text items, for example, each item in the list could have its own action category, comprising the full history of actions setting that item's content as a result of each successive user edit.

Reinstating or replicating an island as it was at a given time notionally requires replaying all the actions—all the island's events—up to that time. Careful choice of action categories can dramatically short-cut that process. Given the time-ordered list of all island events, it is trivial to identify (at 1720) the last action in each category prior to the specified time. For each of the text items described above, this latest action is enough to specify fully the item's state; all earlier actions in the category can simply be ignored. However, for some forms of object state the last action alone might not be sufficient—for example, if the object is required to display explicitly the trail of recent changes to its state. Such categories would be identified (at 1730), then the list of all actions in all categories compacted (at 1740) to retain, depending on the category, just the single latest action or a set of recent ones. A further benefit of treating an island's events in mutually independent categories is that variants can be generated (at 1750) simply by injecting alternative actions in place of the relevant action(s) post compaction.

Moving on, as noted, reflector relocation has the benefit not only of reducing latencies, but may also be used to increase the security of the overall system. Since the reflector relocation is an extremely light weight transaction, this process could be leveraged to switch reflectors every few minutes or even seconds. This makes it very difficult to track user traffic and may be used to mitigate denial of service (DDOS) style attacks.

This is particularly true when one considers that the initial island generation may leverage public-private key pairs such that only trusted users have access to the communications between the islands. This enables end-to-end encryption of all messaging, such that even the reflector itself may be unable to read the messages between the local machines. Selection of the new reflector location would not even be known to the old reflector, as this is negotiated between the peer local machines. Thus, a bad actor would need to have hacked a participant to track even basic activity within the islands.

Figure 18:
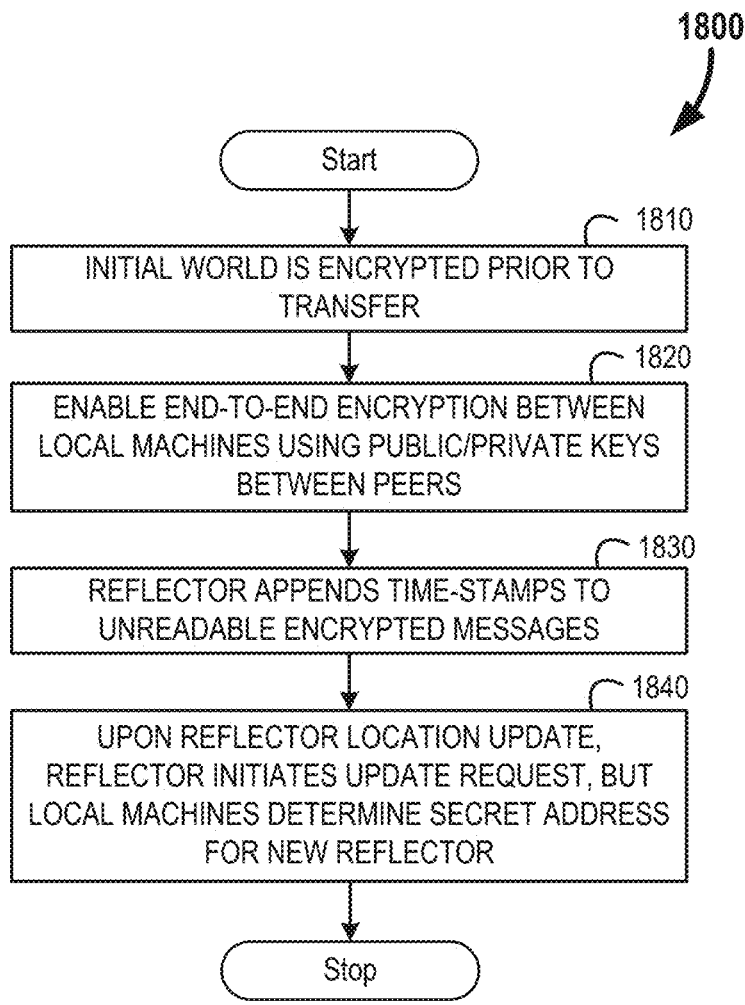
FIG. 18 is a flow diagram for an example process of secure generation of the virtual environment, in accordance with some embodiments.

FIG. 18 is a flow diagram for an example process of secure generation of the virtual environment, shown generally at 1800. In this example process the initial world is encrypted prior to transfer from one local machine to another (at 1810). End to end encryption is enabled between the various local machines utilizing public-private keys (at 1820). The reflector thus appends the timestamps to unreadable (for the reflector) messages (at 1830). Thus a bad actor located at the reflector would be unable to gain access to any island data. Further, upon reflector location update, the reflector initiates the update request but the local machines negotiate the secret address for the new reflector (at 1840). So even usage levels, message cadence, and other such information cannot be collected by a bad actor as they will be unable to determine where the new reflector location will be.

Although not illustrated, additional advantages are afforded by the presently disclosed systems and methods for shared virtual environments. These include the ability to perform load balancing over multiple frames, in one embodiment. Simulation time advances only when a heartbeat message is received from the reflector. If the heartbeat rate is lower than the rendering frame rate (which is normally the case), this leads to bursts of CPU activity in a frame when a beat is received, and the CPU being idle in frames when no beat was received. If the time needed to advance the simulation is larger than one frame, this leads to stuttering. Embodiments limit the time spent simulating per frame to distribute the CPU load over multiple frames. This makes better use of the available computing power leading to smoother game play.

In yet another embodiment, part of the session ID is generated by hashing all client code. This guarantee that clients in one session always execute the same code, ensuring bit-identical simulation of islands. If there is the slightest difference in code, the code hash will be different, so a different session ID will be used.

IV. System Embodiments

Figure 19A:
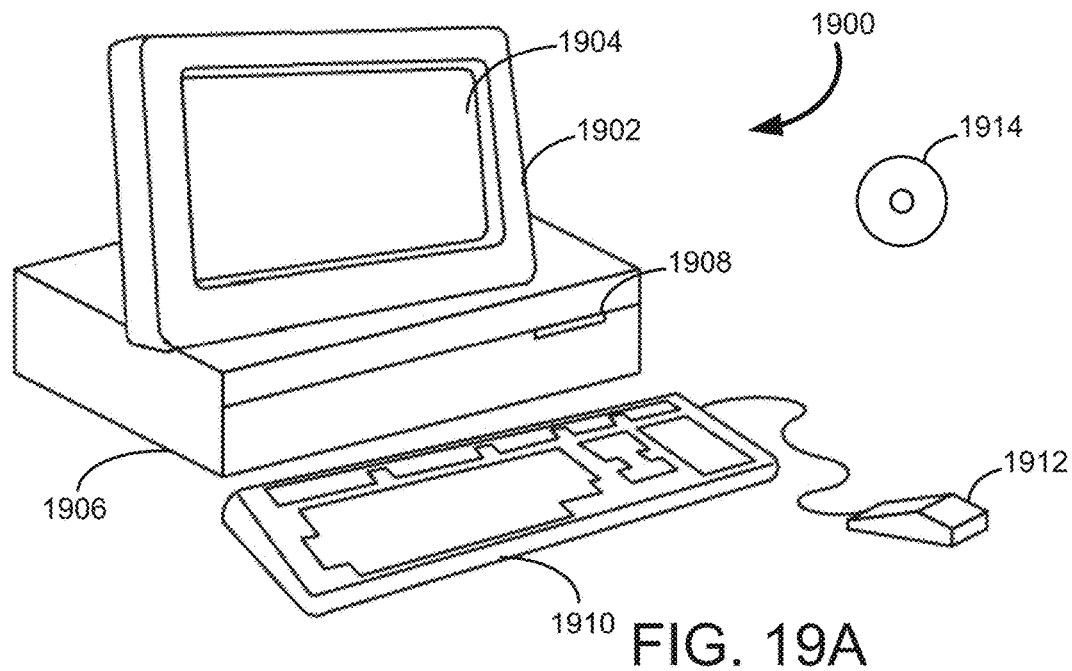
FIGS. 19A and 19B are example illustrations of a computer system capable of embodying the current invention.
Figure 19B:
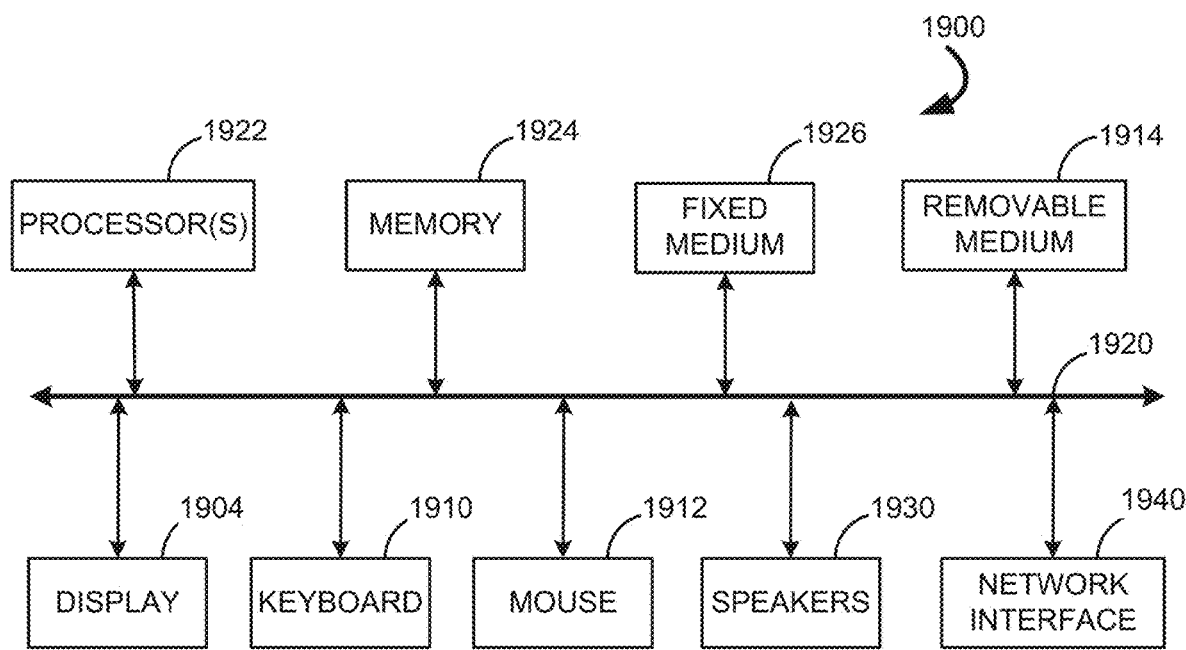
Figure 20A:
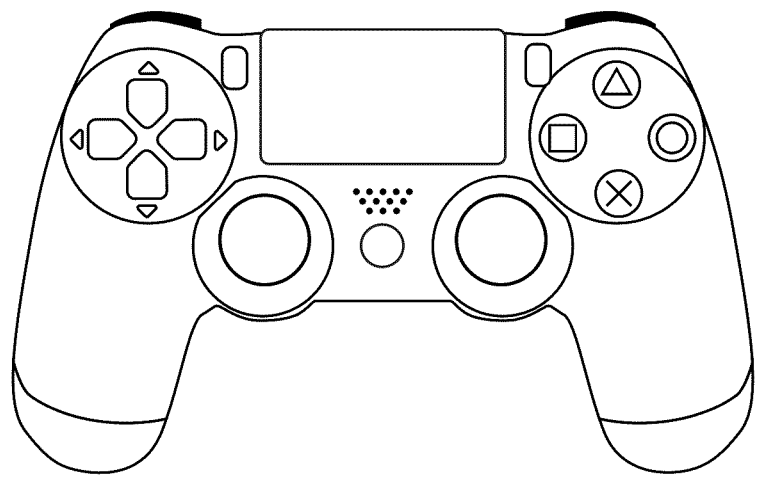
FIGS. 20A, 20B, 20C, 20D, 21A and 21B are example illustrations of an applicable gaming TO device, useful for interacting with the disclosed shared environment.
Figure 20B:
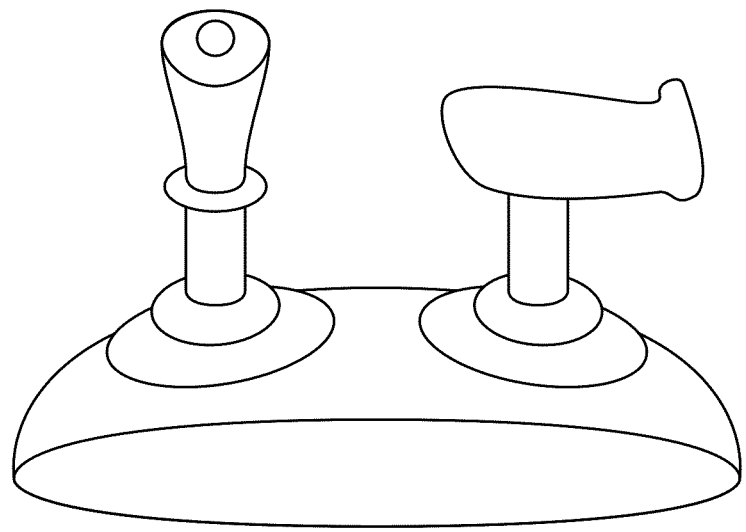
Figure 20C:
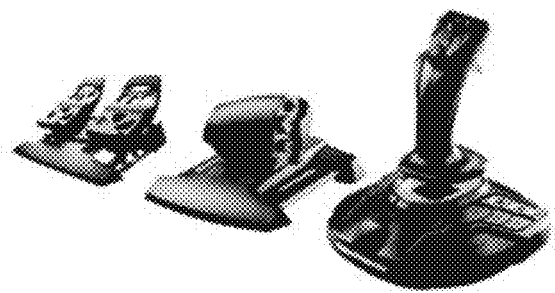
Figure 20D:
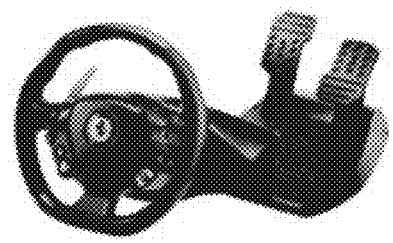

Now that the systems and methods for the collaborative virtual environment have been described, attention shall now be focused upon systems capable of executing the above functions. To facilitate this discussion, FIGS. 19A and 19B illustrate a Computer System 1900, which is suitable for implementing embodiments of the present invention. FIG. 19A shows one possible physical form of the Computer System 1900. Of course, the Computer System 1900 may have many physical forms ranging from a printed circuit board, an integrated circuit, and a small handheld device up to a huge super computer. Computer system 1900 may include a Monitor 1902, a Display 1904, a Housing 1906, a Storage Drive 1908, a Keyboard 1910, and a Mouse 1912. Storage 1914 is a computer-readable medium used to transfer data to and from Computer System 1900.

FIG. 19B is an example of a block diagram for Computer System 1900. Attached to System Bus 1920 are a wide variety of subsystems. Processor(s) 1922 (also referred to as central processing units, or CPUs) are coupled to storage devices, including Memory 1924. Memory 1924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Storage 1926 may also be coupled bi-directionally to the Processor 1922; it provides additional data storage capacity and may also include any of the computer-readable media described below. Fixed Storage 1926 may be used to store programs, data, and the like and is typically a secondary storage medium (such as a hard disk) that is slower than primary storage. It will be appreciated that the information retained within Fixed Storage 1926 may, in appropriate cases, be incorporated in standard fashion as virtual memory in Memory 1924. Removable Storage 1914 may take the form of any of the computer-readable media described below.

Figure 21A:
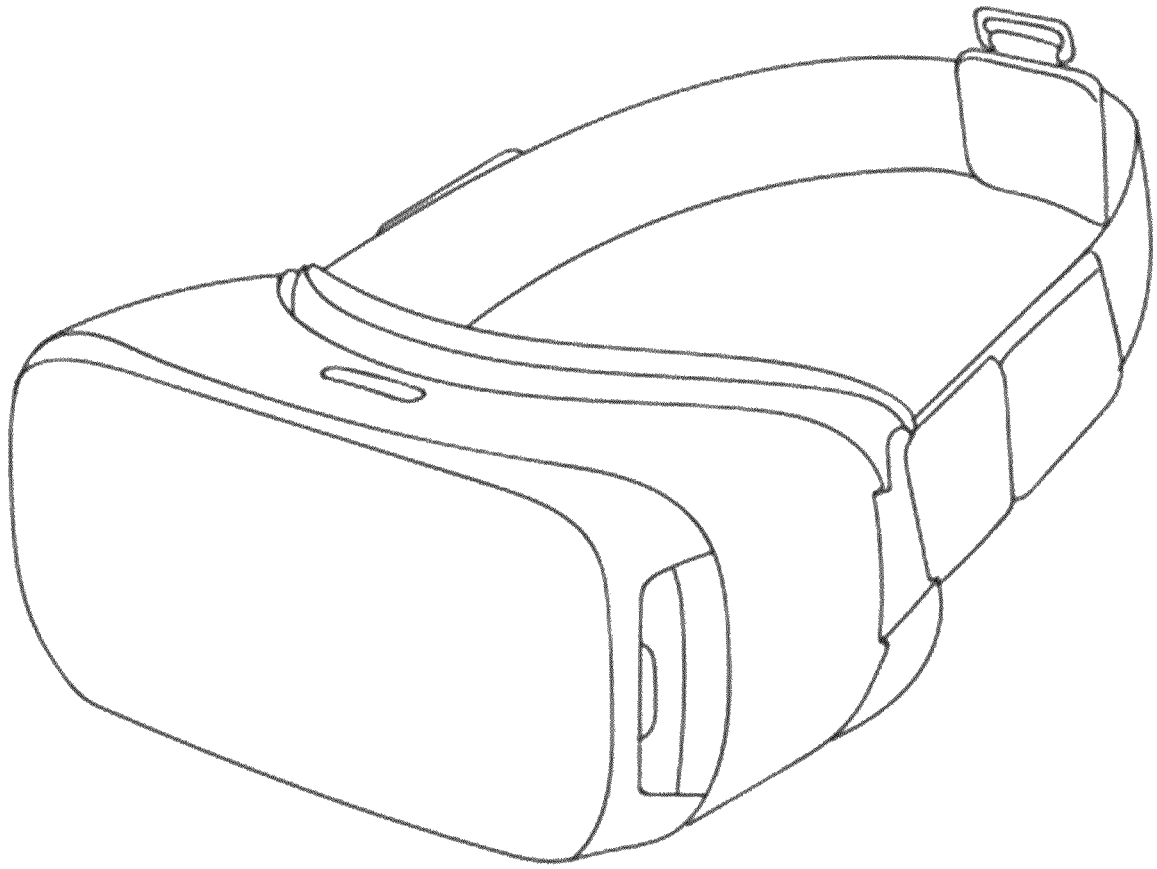
Figure 21B:
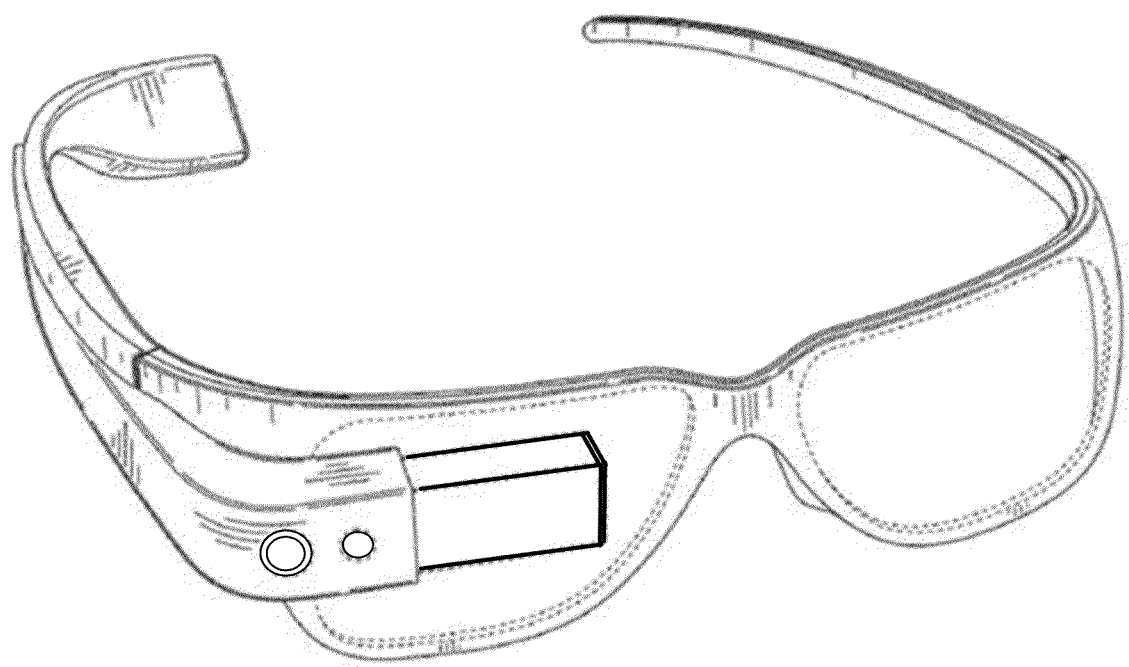

Processor 1922 is also coupled to a variety of input/output devices, such as Display 1904, Keyboard 1910, Mouse 1912 and Speakers 1930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Examples of typical input/output devices that are particularly relevant to a virtual 3D environment being proposed may include advanced gaming style controllers, such as those seen in FIGS. 20A-D, or immersive virtual reality and/or augmented reality headsets, such as those seen in relation to FIGS. 21A and 21B.

Processor 1922 optionally may be coupled to another computer or telecommunications network using Network Interface 1940. With such a Network Interface 1940, it is contemplated that the Processor 1922 might receive information from the network or might output information to the network in the course of performing the above-described virtual environments. Furthermore, method embodiments of the present invention may execute solely upon Processor 1922 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1900 can be controlled by operating system software that includes a file management system, such as a storage operating system. One example of operating system software with associated file management system software is the family of operating systems known as Windows® from Microsoft Corporation of Redmond, WA, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general-purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a virtual machine, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for reducing latency in a shared virtual environment comprising:
   replicating islands including a plurality of virtual objects across at least two local machines, wherein the replication is timing dependent, and the timing is controlled by heartbeat messages from a reflector, and wherein the virtual objects include a state and a behavior, and wherein the virtual objects publish events, subscribe to events and request future events;
   wherein each replicated island receives an identical queue of messages, wherein each message includes an action for an object of the plurality of objects, a timing for each of the messages and a sequence for each of the messages, and wherein the messages are deterministically executed on each of the at least two local machines in order of the sequence including and up to the timing equal to the heartbeat message thereby ensuring exact mirroring of the replicated islands across the at least two local machines;
   determining if a dominant local machine exists among the at least two local machines, wherein the dominant local machine is a local machine responsible for most activity within the replicate islands;
   determining a digital distance between each local machine and prospective reflector locations, where the digital distance is a latency value;
   receiving a reflector relocation request;
   selecting a reflector location with the lowest digital distance to a dominant local machine when the dominant local machine is present; and
   selecting a reflector location to minimize digital distance for all local machines while ensuring no digital distance is above a threshold for any given local machine when no dominant machine is present.

2. The method of claim 1, wherein the dominant machine is determined by configuration.

3. The method of claim 1, wherein the dominant machine is determined by activity.

4. The method of claim 1, wherein the threshold is 150 ms.

5. The method of claim 1, wherein the threshold is 200 ms.

6. The method of claim 1, wherein the digital distance is the round-trip ping and rendering latency.

7. The method of claim 1, wherein the reflector is locally hosted when only one local machine exists.

8. The method of claim 1, wherein the reflector relocation request is responsive to the addition or removal of a local machine.

9. The method of claim 1, wherein the reflector relocation request is periodic.

10. The method of claim 9, wherein the reflector relocation request occurs every 2 seconds to 3 minutes.

11. A computer program product embodied on a non-transitory computer memory which, when executed by a computer system, completes the steps of:

replicating islands including a plurality of virtual objects across at least two local machines, wherein the replication is timing dependent, and the timing is controlled by heartbeat messages from a reflector, and wherein the virtual objects include a state and a behavior, and wherein the virtual objects publish events, subscribe to events and request future events;

wherein each replicated island receives an identical queue of messages, wherein each message includes an action for an object of the plurality of objects, a timing for each of the messages and a sequence for each of the messages, and wherein the messages are detenministically executed on each of the at least two local machines in order of the sequence including and up to the timing equal to the heartbeat message thereby ensuring exact mirroring of the replicated islands across the at least two local machines;

determining if a dominant local mchine exists among the at least two local machines, wherein the dominant local machine is a local machine responsible for most activity within the replicate islands;

determining a digital distance between each local machine and prospective reflector locations, where the digital distance is a latency value;

receiving a reflector relocation request;

selecting a reflector location with the lowest digital distance to a dominant local machine when the dominant local machine is present; and selecting a reflector location to minimize digital distance for all local machines while ensuring no digital distance is above a threshold for any given local machine when no dominant machine is present.

* * * * *